United States Patent
Holenstein et al.

(10) Patent No.: US 7,177,866 B2
(45) Date of Patent: *Feb. 13, 2007

(54) ASYNCHRONOUS COORDINATED COMMIT REPLICATION AND DUAL WRITE WITH REPLICATION TRANSMISSION AND LOCKING OF TARGET DATABASE ON UPDATES ONLY

(75) Inventors: Bruce D. Holenstein, Media, PA (US); Paul J. Holenstein, Downingtown, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 377 days.

This patent is subject to a terminal disclaimer.

(21) Appl. No.: 10/664,418

(22) Filed: Sep. 17, 2003

(65) Prior Publication Data
US 2004/0133591 A1    Jul. 8, 2004

Related U.S. Application Data

(63) Continuation-in-part of application No. 10/112,129, filed on Mar. 29, 2002, now Pat. No. 7,103,586, which is a continuation-in-part of application No. 09/810,674, filed on Mar. 16, 2001, now Pat. No. 6,662,196.

(60) Provisional application No. 60/411,774, filed on Sep. 17, 2002.

(51) Int. Cl.
*G06F 7/00* (2006.01)
*G06F 17/30* (2006.01)
*G06F 12/00* (2006.01)

(52) U.S. Cl. .......................................... 707/8; 707/204
(58) Field of Classification Search .................... 707/1, 707/2, 10, 102, 200, 8, 202, 204; 395/600
See application file for complete search history.

(56) References Cited

U.S. PATENT DOCUMENTS

| 4,881,166 A | 11/1989 | Thompson et al. |
| 5,036,518 A | 7/1991 | Tseung |
| 5,095,421 A | 3/1992 | Freund |
| 5,276,871 A | 1/1994 | Howarth |
| 5,452,445 A * | 9/1995 | Hallmark et al. ............... 707/2 |
| 5,579,318 A | 11/1996 | Reuss et al. |
| 5,615,364 A | 3/1997 | Marks |
| 5,680,573 A | 10/1997 | Rubin et al. |
| 5,710,922 A | 1/1998 | Alley et al. |
| 5,721,915 A | 2/1998 | Sockut et al. |

(Continued)

OTHER PUBLICATIONS

Gray et al., "The Dangers of Replication and a Solution", The Proceedings of the ACM SIGMOD Conference at Montreal, pp. 173-182, 1996.*

(Continued)

*Primary Examiner*—Jeffrey Gaffin
*Assistant Examiner*—Michael J. Hicks
(74) *Attorney, Agent, or Firm*—Akin Gump Strauss Hauer & Feld, LLP

(57) ABSTRACT

Tokens are used to prepare a target database for replication from a source database and to confirm the preparation in an asynchronous coordinated commit replication process. During a dual write replication process, transmission of the replicated data and locking of data records in the target database occurs only on updates.

18 Claims, 17 Drawing Sheets

U.S. PATENT DOCUMENTS

| | | | |
|---|---|---|---|
| 5,721,916 A | 2/1998 | Pardikar | |
| 5,721,918 A | 2/1998 | Nilsson et al. | |
| 5,734,898 A | 3/1998 | He | |
| 5,737,601 A | 4/1998 | Jain et al. | |
| 5,740,433 A | 4/1998 | Carr et al. | |
| 5,745,753 A | 4/1998 | Mosher et al. | |
| 5,757,669 A | 5/1998 | Christie et al. | |
| 5,758,150 A | 5/1998 | Bell et al. | |
| 5,778,388 A | 7/1998 | Kawamura et al. | |
| 5,781,910 A | 7/1998 | Gostanian et al. | |
| 5,794,252 A | 8/1998 | Bailey et al. | |
| 5,799,305 A * | 8/1998 | Bortvedt et al. | 707/10 |
| 5,799,306 A | 8/1998 | Sun et al. | |
| 5,799,322 A | 8/1998 | Mosher, Jr. | |
| 5,799,323 A | 8/1998 | Mosher, Jr. et al. | |
| 5,806,074 A | 9/1998 | Souder et al. | |
| 5,806,075 A | 9/1998 | Jain et al. | |
| 5,832,203 A | 11/1998 | Putzolu et al. | |
| 5,835,915 A | 11/1998 | Carr et al. | |
| 5,864,851 A | 1/1999 | Breitbart et al. | |
| 5,870,761 A | 2/1999 | Demers et al. | |
| 5,884,325 A | 3/1999 | Bauer et al. | |
| 5,884,327 A | 3/1999 | Cotner et al. | |
| 5,884,328 A | 3/1999 | Mosher, Jr. | |
| 5,924,095 A | 7/1999 | White | |
| 5,924,096 A | 7/1999 | Draper et al. | |
| 5,937,414 A | 8/1999 | Souder et al. | |
| 5,970,488 A | 10/1999 | Crowe et al. | |
| 5,991,771 A | 11/1999 | Falls et al. | |
| 6,012,059 A | 1/2000 | Neimat et al. | |
| 6,032,158 A | 2/2000 | Mukhopadhyay et al. | |
| 6,122,630 A | 9/2000 | Strickler et al. | |
| 6,243,702 B1 | 6/2001 | Bamford et al. | |
| 6,243,715 B1 | 6/2001 | Bogantz et al. | |
| 6,353,834 B1 | 3/2002 | Wong et al. | |
| 6,363,401 B2 | 3/2002 | Yahya et al. | |
| 6,493,726 B1 | 12/2002 | Ganesh et al. | |
| 6,662,196 B2 * | 12/2003 | Holenstein et al. | 707/202 |
| 2002/0133507 A1 * | 9/2002 | Holenstein et al. | 707/200 |

OTHER PUBLICATIONS

Pedone et al., "Exploiting Atomic Broadcast in Replicated Databases", Euro-Par'98, LNCS 1470, pp. 513-520, 1998; Springer-Verlag Berlin Heidelberg.*

Kemme et al., "Don't be lazy, be consistent: Postgres-R, A new way to implement Database Replication", Proceedings of the 26th VLDB Conference, Cairo, Egypt, 2000.*

Arevalo et al., "Deterministic Scheduling for Transactional Multithreaded Replicas", 19th IEEE Symposium on Reliable Distributed System (SRDS'00) p. 164, 2000.*

Holliday et al., "The performance of database replication with group multicast", Fault-Tolerant Computing, 1999. Digest of Papers. Twenty-Ninth Annual International Symposium on Jun. 15-18, 1999 pp. 158-165.*

Kemme et al., "Online Reconfiguration in Replicated Databases Based on Group Communication," dsn, p. 0117, the International Conference on Dependable Systems and Networks (DSN'01), 2001.*

Wiesmann et al., "Database Replication Techniques: A Three Parameter Classification," srds, p. 206, 19th IEEE Symposium on Reliable Distributed Systems (SRDS'00), 2000.*

Son et al., "Replication Control for Distributed real-Time Database Systems", In Proc. of Int. Conf. on Distributed Computing Systems, pp. 144-151, 1992; IEEE.*

Description of Two-Phase Commit Mechanism, Oracle8 Distributed Database Systems, Release 8.0, Document No. A58247-01, 1997, 3 pages.

Processing SQL Statements, Oracle7 Server Application Developer's Guide, 1996, 26 pages.

Data Concurrency, Oracle7 Server Concepts Manual, 1996, 28 pages.

Image/SQL: Issues and answers concerning SQL tables, Hewlett-Packard Company, Nov. 29, 1995, 34 pages.

Q&A: Replication in Microsoft Access for windows 95, Microsoft Office Developer Forum, Nov. 22, 1995, 8 pages.

Multi-Version Concurrency Control, PostgreSQL User's Guide, Index and Chapter 10, 60-63, 1996-99, 11 pages.

Bodin et al., "Evaluating Two Loop Transformations for Reducing Multiple Writer False Sharing", 7th Annual Workshop on Languages and Compiler for Parallel Computing, New York, Aug. 1994.

Oracle SQL*Loader FAQ, printout from web site: http://www.orafaq.org/faqloadr.htm, printout date: Jun. 1, 2001, article date: Jan. 23, 2001, 6 pages.

Using the Oracle Bulk Loader, printout from web site: http://www-db.stanford.edu/~ullman/fcdb/oracle/or-load.html, printout date: Jun. 1, 2001, article date: 1997-1999, 4 pages.

Solutions to Common SQL*LOADER Questions, printout from web site: http://www.fors.com/orasupp/rdbms/utils/140121_1.htm, printout date: Jun. 1, 2001, article date: Feb. 1995, 5 pages.

VERITAS Volume Replicator™ 3.2, Administrator's Guide, Aug. 2001, pp. 1-4.

Double-Take Theory of Operation, Network Specialists, Inc., Sep. 2001, pp. 31-34.

Sun StorEdge™ Network Data Replicator Software Boosts Data Center Resilience, Storage White Paper, Sun Microsystems, original publication data is unknown, printout from Sun Microsystems web site: http://www.sun.com/storage/white-papers/sndr.html printout date: Jan. 18, 2002, 25 pages.

Disk Mirroring—Local or Remote, White Paper, Computer Network Technology Corp. (CNT), 2001, 14 pages (no p. 2).

"The Advantages and Disadvantages of Mirroring, Shared Disk and File Replication as High Availability Architectures," printout from google.com cache of web site: http://kb.com.vinca.com/public/whitepapers/ntco_ha4nt.html printout date: Mar. 1, 2002, 5 pages.

Replication Agent for IMS and VSAM User's Guide for MVS, original publication date is unknown, printout from Sybase web site: http://manuals.sybase.com/onlinebooks/group-ra/rav110e/bmcug, printout date: Jan. 23, 2002, 12 pages.

Sang Hyuk Son et al. "A Token-Based Resiliency Control Scheme in Replicated Database Systems," Proceedings of the 5th Symposium on Reliability In Distributed Software and Database Systems, Jan. 1986, pp. 199-206.

Partial European Search Report for EP 03006626, mail date: Oct. 31, 2005, 5 pages.

I. Stanoi et al. "Using Broadcast Primitives in Replicated Databases," Proceedings of the 18th International Conference on Distributed Computing Systems, May 26, 1998-May 29, 1998, pp. 148-155.

Wanlei Zhou et al. "The Design and Evaluation of a Token-Based Independent Update Protocol," Parallel and Distributed Computing Systems, Nov. 3-6, 1999, 6 pages.

European Search Report for EP 02005562, mail date: Nov. 7, 2005, 4 pages.

* cited by examiner

RTC TABLE A

| TIME | CONTENTS | |
|---|---|---|
| | TRAN ID | FLAG |
| $t_1$ | | |
| $t_2$ | | |
| $t_3$ | | |
| $t_4$ | 101 | 0 |
| $t_5$ | 101 | 1 |
| $t_6$ | * | |
| ... | | |
| $t_n$ | | |

\* NO ENTRY (TRAN ID 101 HAS BEEN DELETED FROM TABLE)

AUDIT TRAIL A

| TIME | HEADER | | DATA |
|---|---|---|---|
| | TRAN ID | TABLE | |
| $t_1$ | 101 | | BEGIN TRANS. 101 |
| $t_2$ | 101 | ACCOUNTS | SMITH, JOHN, DEBIT $10 |
| $t_3$ | 101 | ACCOUNTS | DOE, JANE, CREDIT $10 |
| $t_4$ | 101 | | RTC TOKEN 101 |
| $t_5$ | | | |
| $t_6$ | 101 | | COMMIT TRANS. 101 |

AUDIT TRAIL B

| TIME | HEADER | | DATA |
|---|---|---|---|
| | TRAN ID | TABLE | |
| $t_1+\alpha$ | 101 | | BEGIN TRANS. 101 |
| $t_2+\alpha$ | 101 | ACCOUNTS | SMITH, JOHN, DEBIT $10 |
| $t_3+\alpha$ | 101 | ACCOUNTS | DOE, JANE, CREDIT $10 |
| $t_4+\alpha$ | 101 | | RTC TOKEN 101 |
| $t_5+\alpha$ | | | |
| $t_6+\alpha$ | 101 | | COMMIT TRANS. 101 |

*Fig. 3*

| Node | Time | Transaction amount | Comments |
| --- | --- | --- | --- |
| A, B | T1 | | Account balance initially at $1000, both nodes A and B synchronized. |
| A, B | T2 | +$200 | Customer deposits (adds) $200 to account balance from node A. Using the synchronous replication method, both nodes are updated to a balance of $1200 |
| A, B | T3 | -$75 | Customer withdrawals (subtracts) $75 from the account balance from node B. Using the synchronous replication method, both nodes are updated to a balance of $1125 |
| A, B | T4 | -$125 | Customer transfers (subtracts) $125 from the account balance to a foreign account from node A. Using the synchronous replication method, both nodes are updated to a balance of $1000 |
| | T5 | | All communications between nodes A and B is lost. A = B = $1000 |
| A | T6 | +$100 | Customer adds $100 to account balance on node A. A balance = $1100, B balance = $1000 |
| B | T7 | -$50 | Customer withdrawals $50 from account balance on node B. A node balance = $1100, B node balance = $950. |
| A, B | T8 | | Full communications is restored, and the system resolves collisions as follows: A replays the transaction delta changes into B, B replays the transaction delta changes into A. The order of replay could be arbitrary. One could even 'merge' the two replay streams, using timestamps or sequence numbers, etc. The main point is that the account balances will match after all are replayed into the others. |
| A -> B | T9 | +100 | More specifically, replaying the A transactions to the B database adds $100 to the B balance of $950, making it $1050.<br><br>NOTE – we could be done by simply overwriting the A database balance with the B database balance, however replaying in the reverse provides a 'check' of the approach. |
| B -> A | T10 | -50 | Replaying the B transactions to the A database subtracts $50 from the A balance of $1100, making it $1050. |
| A, B | T11 | | Compare the two balances, A=B and the databases are in sync. If other criteria are met, synchronous replication can be resumed. |

*Figure 8*

Split System Architectures

Dual Writes

Coordinated Commits

Synchronous Replication Efficiency

Equal Efficiency (e=1)

ASYNCHRONOUS COORDINATED COMMIT REPLICATION AND DUAL WRITE WITH REPLICATION TRANSMISSION AND LOCKING OF TARGET DATABASE ON UPDATES ONLY

CROSS-REFERENCE TO RELATED APPLICATIONS

This application is a continuation-in-part of U.S. Non-Provisional Application No. 10/112,129 filed Mar. 29, 2002 now U.S. Pat. No. 7,103,586 entitled "COLLISION AVOIDANCE IN DATABASE REPLICATION SYSTEMS," which in turn is a continuation-in-part of U.S. Non-Provisional Application No. 09/810,674 filed Mar. 16, 2001 now U.S. Pat. No. 6,662,196 entitled "COLLISION AVOIDANCE IN BIDIRECTIONAL DATABASE REPLICATION," the disclosures of which are both incorporated herein by reference.

This application claims the benefit of U.S. Provisional Application No. 60/411,774 filed Sep. 17, 2002 entitled "PERFORMANCE IMPLICATIONS OF SYNCHRONOUS DATA REPLICATION."

BACKGROUND OF THE INVENTION

The present invention relates to the field of data replication.

"Bidirectional Database Replication" is specified as the application of database deltas (i.e., the results of transactions being performed against a database) from either of two databases in a pair to the other one. Transaction I/O (e.g., inserts, updates, and deletes) applied to one database are applied to the other database and vice-versa. Both databases are "live" and are receiving transactions from applications and/or end users. U.S. Pat. No. 6,122,630 (Strickler et al.), which is incorporated by reference herein, discloses a bidirectional database replication scheme for controlling transaction ping ponging.

In the database world, a collision is classically defined as a conflict that occurs during an update. A collision occurs when a client reads data from the server and then attempts to modify that data in an update, but before the update attempt is actually executed another client changes the original server data. In this situation, the first client is attempting to modify server data without knowing what data actually exists on the server. Conventional techniques for minimizing or preventing collisions include database locking and version control checking. These techniques are commonly used in systems that have one database, wherein many users can access the data at the same time.

When a database system includes replicated databases, the problem of collisions becomes greater, since clients may be requesting database changes to the same data at the same physical or virtual location or at more than one physical or virtual locations. Collision or conflict detection schemes have been developed for replicated database systems. After a collision is detected, a variety of options are available to fix or correct the out-of-sync databases. However, it would be more desirable to prevent collisions from happening in the first place.

One conventional distributed transaction scheme used in Oracle distributed database systems is known as the "two-phase commit mechanism." This approach is classically used to treat a "distributed" transaction, i.e., a transaction that spans multiple nodes in a system and updates databases on the nodes, as atomic. Either all of the databases on the nodes are updated, or none of them are updated. In a two-phase commit system, each of the nodes has a local transaction participant that manages the transaction steps or operations for its node.

The two phases are prepare and commit. In the prepare phase, a global coordinator (i.e., the transaction initiating node) asks participants to prepare the transaction (i.e., to promise to commit or rollback the transaction, even if there is a failure). The participants are all of the other nodes in the system. The transaction is not committed in the prepare phase. Instead, all of the other nodes are merely told to prepare to commit. During the prepare phase, a node records enough information about the transaction so that it can subsequently either commit or abort and rollback the transaction. If all participants respond to the global coordinator that they are prepared, then the coordinator asks all nodes to commit the transaction. If any participants cannot prepare, then the coordinator asks all nodes to roll back the transaction.

A side effect of this scheme is often a degree of collision prevention. Prior to the prepare phase, locks are placed on the appropriate data and the data is updated, thereby preventing many types of collisions. For example, the well-known technique of "dual writes" can be used to lock and update the appropriate data. In this technique, the application originating the transaction (or a surrogate library, device, or process on behalf of the application) performs the local I/O changes and replicates the I/O changes as they occur and applies them directly into the target database. Typically, the application's individual I/O changes to the source database are "lock-stepped" with the I/O changes to the target database. That is, the local I/O change does not complete until the remote I/O change is also complete.

The scheme of using two phase commit with a technique such as dual writes (also referred to as "two phase commit" in this document) relies on a transaction coordinator for both local and remote database updating. If there are a large number of nodes in the system, the transaction coordinator must actively manage the updating of all of the other nodes. The node coordination puts large processing demands on the transaction coordinator and requires a large amount of messaging to occur throughout the system. Due to its messaging nature, the two phase commit mechanism is not used for efficient replication of distributed databases.

Accordingly, there is an unmet need for a collision avoidance scheme in a database replication system that is relatively simple to implement, efficiently uses communication medium, scales efficiently and easily, prevents all types of collisions, and which does not place large demands on local application programs to perform complex node coordination duties.

There is also an unmet need for methods to determine when to switch replication systems that normally operate in a synchronous mode to an asynchronous mode, and subsequently back to a synchronous mode.

The present invention, also referred to as "coordinated commits" in the subsections below, fulfills these needs.

BRIEF SUMMARY OF THE INVENTION

Tokens are used to prepare a target database for replication from a source database and to confirm the preparation in an asynchronous coordinated commit replication process. During a dual write replication process, transmission of the replicated data and locking of data records in the target database occurs only on updates.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings:

FIG. 3 shows a ready to commit table and audit trails used in the system of FIGS. 2A and 2B;

FIG. 8 shows a table that illustrates a collision resolution scenario in accordance with one embodiment of the present invention.

DETAILED DESCRIPTION OF THE INVENTION

Figure 1:
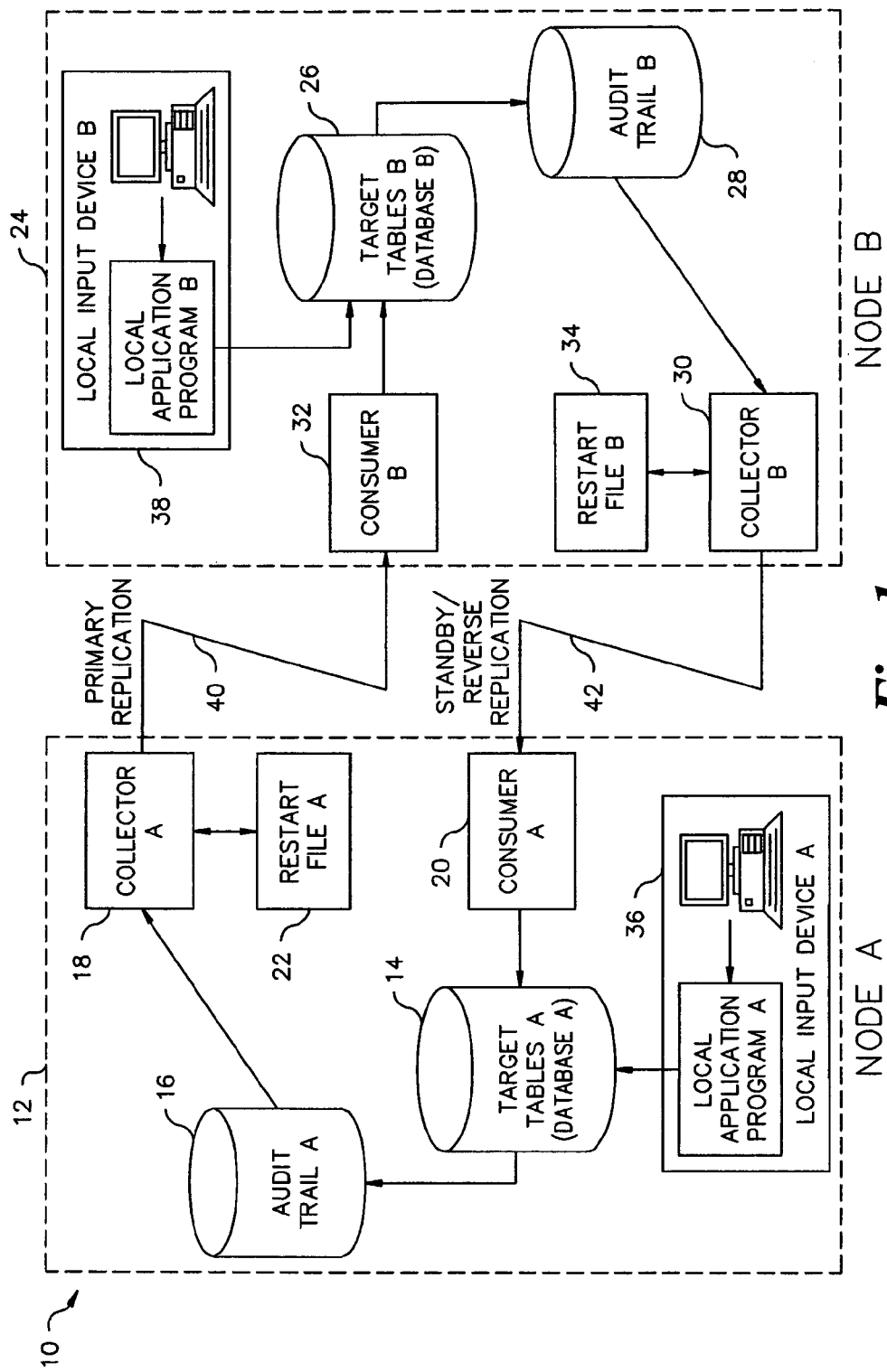
FIG. 1 is a schematic block diagram of a prior art bidirectional database replication system.

Certain terminology is used herein for convenience only and is not to be taken as a limitation on the present invention. In the drawings, the same reference letters are employed for designating the same elements throughout the several figures.

A. Definitions

The following definitions are provided to promote understanding of the invention. For clarity, the definitions are phrased with respect to a scheme that replicates only two databases. However, the scope of the invention includes schemes where replication occurs between more than two databases.

Replication—duplicating the contents of at least a portion of data records held in a source database to a target database. In the narrowest sense, replication involves duplicating the entire contents and format of the data records so that the two databases are totally identical, and thus interchangeable with each other. In the broadest sense, replication as defined herein involves duplicating at least the contents of a portion of the data records, and not necessarily duplicating the format of the data records. Replication thus may involve data transformation or filtering wherein the source data is altered in some manner before being applied to the target database. The concept of replication vs. transformation of data is discussed in more detail below.

Replication Data—includes both "absolute" database information (e.g., set the price field to a certain value), as well as "relative" database information (e.g., add $10 or 10% to the price field).

Collector—an object or process that reads an audit trail, transaction log file, database change queue or similar structure of a first database, extracts information about specified changes to the first database (e.g., insertions, updates, deletions), and passes that information to the consumer object or process defined below. In Shadowbase® (a commercially available product made by ITI, Inc., Paoli, Pa.) executing on a COMPAQ NSK (Tandem) source, the collector reads TMF or TM/MP audit trails. In a bidirectional database replication scheme, each of the two databases has an associated collector. The extractor process shown in FIG. 1 of U.S. Pat. No. 5,745,753 (Mosher, Jr.) assigned to Tandem Computers, Inc is similar in operation to the collector.

Transaction Transmitter—device or object which sends transactions posted to one database to the other database for replication in the other database. In accordance with preferred embodiments of the present invention, transaction transmitters typically group one or more of the transaction operations or steps into blocks for efficient transmission to the transaction receivers. In one embodiment of the present invention, the transaction transmitter is identical to the collector. In other embodiments, the transaction transmitter performs some, but not all, of the functions of the collector. In a bidirectional database replication scheme, each of the two databases has an associated transaction transmitter.

Consumer—an object or process that takes messages about database changes that are passed by the collector object or process and applies those changes to the second database. In a bidirectional database replication scheme, each of the two databases has an associated consumer. The receiver process shown in FIG. 1 of Tandem's U.S. Pat. No. 5,745,753 is similar in concept to the consumer, except that the consumer described herein can process multi-threaded (i.e., overlapping) transactions, whereas the receiver process in the Tandem patent cannot process multi-threaded transactions.

Transaction Receiver—device or object which receives transactions sent by a transaction transmitter for posting to a database. In accordance with the present invention, transaction receivers typically unblock the transaction operations or steps as they are received and apply them into the database. Depending on the nature of the transaction operations or steps, they may be applied in parallel or serially, and the transaction profile may be serialized or multi-threaded (that is, one transaction may be replayed at a time, the transactional order may be altered, and/or the transactions may be replayed in the "simultaneous, intermixed" nature that they occurred in the source database). In one embodiment of the present invention, the transaction receiver is identical to the consumer. In other embodiments, the transaction receiver performs some, but not all, of the functions of the consumer. In a bidirectional database replication scheme, each of the two databases has an associated transaction receiver.

Database—in the broadest sense, a database as defined herein comprises at least one table or file of data, or a portion of a table or file of data wherein the data is typically arranged in records called rows. In a narrower sense, a database is also a collection of tables or files, that is, multiple tables or files make up a database. Replication among databases thus has different meanings depending upon how the database is defined. Consider the following examples:

1. A system includes a single database which has two tables or files (i.e., two sub-databases) and the database replicates to itself. Replication thus maintains the two tables or files in the same state. The tables or files are in the same physical location, and each has a respective audit trail, collector and consumer.

2. A system includes a single database which has one table or file partitioned into two parts and the database replicates to itself. The first part has a plurality of records, and the second part has a plurality of records which must be kept in the same state as the first plurality of records. Replication thus maintains the two parts of the table or file in the same state. The two parts of the table or file are in the same physical location, and each has a respective audit trail, collector and consumer.

3. A system includes two databases, each located remotely from the other. Each database may have one or more tables or files, and the two remotely located databases replicate themselves. Replication thus maintains the two databases (including all of their respective tables or files) in the same state. The two databases are in different physical locations, and each has a respective audit trail, collector and consumer. In a typical scenario, each database resides at a different node within a network.

Table—alternative name for a database. In the preferred embodiment of the present invention, replication and copying of data is performed at the file level. However, other levels of replication/copying are within the scope of the invention, such as diskcopy-type operations which are used to create the databases 126 in FIG. 1 of Tandem's U.S. Pat. No. 5,745,753.

Primary Replication—effectively, unidirectional replication from a first database to a second database.

Row—effectively, a single record out of a database. A row update is an individual step defined to mean a modification (e.g., insert, update, delete) to the database.

Reverse Replication—effectively, unidirectional replication from the second database to the first database.

Transaction—A transaction is a unit of work consisting of one or more individual steps and/or operations to be applied to one or more local and/or remote databases as a single atomic unit of work. A characteristic of transactions is the requirement that either all steps and/or operations are applied or all are rolled back in the case of a problem so that the database(s) is always left in a consistent state. Transactions are often identified by a number or name called the transaction identifier. The transaction identifier is often, though not necessarily, unique. An example of an "individual step" would be to insert a record (row) into the database. An example of an "operation" would be the procedure which increases the price column of all rows in the database by 10%.

In an unaudited (non-transactional) database, each step or operation will be treated as a separate transactional unit of work. The commit step is akin to unlocking the column, row, page or table. The audit trail is akin to an application, system, replication, or other suitable log, disk cache, or change data file or storage medium.

Filtering—The operation of selectively choosing rows or transactions to replicate.

Restart—the steps that need to be taken in the event that one or more of the primary or secondary replication component(s) is unavailable and a restoration of the failed replication component(s) is needed. For example, if a communication channel fails, then any messages that were lost in transit need to be resent during the restart. The restart might be partial, (i.e., just certain or failed components get restarted), or total (i.e., all replication components are stopped and restarted). In either case, a non transient source of information is needed to effectuate the restart, for instance, to tell the collectors where in the audit trail to start reading for transaction data. A restart file is often used for this purpose. In normal operation, the replication components periodically, or at certain events, log their current position to the restart file so that it can be used when a restart is needed. Some desirable aspects of effective restarts include: (1) few and non complex system operator steps needed to effectuate the restart, (2) prevention of duplicate database updates from being applied to the target database, (3) restoration or elimination of missing database updates, and (4) minimal restart time.

Data Transformation—The scope of the present invention also includes schemes which perform transformation of data, instead of strict replication. Examples of transformations include:

1. Replicating Enscribe source data to SQL target tables.
2. Eliminating or adding columns or rows in a target.
3. Combining records from two source files or tables and writing them into one target file or table.
4. Changing the type, structure or length of a field.
5. Taking one source record and writing one target record for each occurrence of a particular field (e.g., data normalization).
6. Writing a source record to a target only when a field contains a specific value (conditional replication).

Deferred transactions—These occur in synchronous replication environments. They are defined as any transactions that have been allowed to commit in one (for example, the originating) environment, and the commit has not yet been sent/applied into the other peer environment(s). A loss of inter-environment communication when a transaction is in the deferred state allows the transaction changes to be applied/unlocked in the environment where they are committed, yet the other environment(s) have not been committed/unlocked. When such a condition exists, the replication engine considers that synchronous replication can no longer be ensured, and may "fall-back" to asynchronous replication to the affected nodes until the problem is resolved and synchronous replication can again be ensured.

Replication latency—elapsed time after an I/O operation is applied to a source database to when the I/O operation is applied into a target database by a replication engine.

Data Collection/Log Techniques—Detailed Definition of Audit Trail

An audit trail (ADT) is akin to an application, system, replication, queue, or other suitable log, disk cache, memory cache, or change data file or storage medium. Its purpose is to hold information about the transaction steps and operations (that is, the database change activity).

The preferred embodiment of the present invention includes many data collection techniques, not just the classic transaction monitor and transaction "redo"/"journal" log, or audit trail, approach defined and used on certain platforms by the Shadowbase product. The primary features of these data collection techniques are that they collect, retain, and serialize the database update activity. Some even provide transactional integrity (i.e., a set of database updates is either fully applied or fully undone). The collected data is saved in a "log" that may be disk-based, memory-based, an application log file, or other queue structure. The data may be stored in transient or non-transient storage. The present invention includes the following data collection techniques:

(1) Reading database "redo" logs. These logs are typically maintained by a transaction processing (tp) subsystem provided by the O/S or database vendor. They typically contain database "before" and/or "after" record images, as these images can be used to restore the before state of a record update (abort situation) or to apply the after state of a database update (commit situation). These monitors typically provide transactional database integrity. Access to these logs, and understanding the format of the data in them, is required to use this technique. Salient features include:

(a) The application and the replication engine are usually "loosely coupled" (i.e., they run independently, and can be independently tuned).

(b) The tp subsystem usually provides automatic redo log retention/management.

The Compaq Transaction Monitoring Facility (TMF) provides this functionality on an NSK system.

(2) Reading database "image" logs. These logs are typically maintained by the application itself, and they contain similar information to the redo logs. The application may or may not provide transactional database integrity. Access to these logs, and understanding the format of the data in them, is required to use this technique. Salient features include:

(a) The application and the replication engine are usually "loosely coupled" (i.e., they run independently, and can be independently tuned).

(b) The application subsystem usually provides automatic image log retention/management.

The Tenera Plant and Information Management System (PIMS) application, commercially available from Tenera Inc., San Francisco, Calif., provides this functionality in the database "cradle" and log files.

(3) Using database triggers and/or stored procedures and/or database "publish and subscribe" (or similar) features to perform the collection of the database change data, and saving the gathered data into a collection log. This technique requires that the database provide a trigger/stored procedure/publish-subscribe mechanism (or something similar) that is available to the replication engine. Salient features include:

(a) The application and the replication engine are usually "tightly coupled" (i.e., they run interdependently), at least for the data collection part.

(b) The replication engine must provide its own log retention/management.

The Shadowbase™ "open" collection environment (e.g., Solaris/Oracle, Windows/MS SQL Server, etc) offers this approach for capturing database change data for the replication engine.

(4) Using an "intercept" library that intercepts application disk I/O calls and saves the database change data into a collection file. This technique requires that the O/S and/or application environment provide an intercept mechanism that is available to the replication engine. Salient features include:

(a) The application and the replication engine are usually "tightly coupled" (i.e., they run interdependently), at least for the data collection part.

(b) The replication engine must provide its own log retention/management.

(c) The application must have the intercept library bound or linked into it (or similar technique). Typically, this requires no coding changes, as the intercept library intercepts the calls, saves the database change data, and executes the I/O (noting if it succeeded or failed).

The Golden Gate Extractor/Replicator product, commercially available from Golden Gate Software, Sausalito, Calif., provides this technique for event capture. The NTI DrNet product, commercially available from Network Technologies International, Inc., Westerville, Ohio, provides this technique for event capture.

(5) Using a "callable" library application-programming interface (API) that performs the application disk I/O on behalf of the application. The library performs the data collection similar to the method used by the intercept library. Salient features include:

(a) The application and the replication engine are usually "tightly coupled" (i.e., they run interdependently), at least for the data collection part.

(b) The replication engine must provide its own log retention/management.

(c) The application must have the callable library bound or linked into it (or similar technique). Typically, this requires application coding changes, as the application must call the API for all disk I/O.

The NetWeave product, commercially available from Vertex Interactive, Clifton, N.J., is an example of this technique.

(6) Using a device driver or file system "plug-in" that is executed when database I/O occurs in the system. The plug-in may be part of the database device drivers or file system, or may be invoked, broadcast, signaled, or similarly notified by these components in a call back, registration, or other announcement fashion when I/O is occurring against the database. The CONTROL-27 processing notification, commercially available from Compaq Computer Corporation, Houston, Tex., provides similar functionality for Himalaya Enscribe I/O database changes.

Transaction Integrity—For those environments that provide transactional integrity, referred to as "audited" systems, the replication engine should (although it is not absolutely necessary) mimic the transactional integrity on the target system. This means that all I/O's in the source transaction are either committed (applied) or aborted (not applied) depending on the final state of the transaction. (If the transactional integrity of the source is not mirrored, the referential integrity on the target may be violated.) Since some replication implementations will apply the database I/O's as they occur, the actual transaction profile of commits/aborts on the source and target databases is preserved. For those implementations that defer applying the I/O's until the final transaction state is known, and then replay them in commit order, typically only committed transactions are applied.

For those environments that do not provide transactional integrity, referred to as "non-audited" systems, the replication engine must treat all individual, successful database change I/O's as if they consist of a transaction begin (implicit), database I/O, and a transaction commit (implicit). Certain unsuccessful database I/O's are still treated as if they were successful, for example, if the base table was updated successfully, yet an index path failure occurred (as the file system would allow the base table/index inconsistency to remain). The scope of the present invention covers non-audited systems.

In the examples of the present invention described below, the first and second transaction transmitters are first and second collectors, the first and second transaction receivers are first and second consumers, and the first and second databases are first and second target tables. Also, the examples below presume that strict database replication occurs without any transformation of the contents of the data or its format. However, the scope of the invention includes unidirectional and bidirectional replication schemes wherein at least the contents of a portion of the data or its format are transformed.

B. Collision Avoidance in Bidirectional Database Replication

FIG. 1 is a diagram of the infrastructure for a prior art bidirectional replication system 10 illustrated and described in U.S. Pat. No. 6,122,630. In this diagram, the two databases or target tables which must be kept in the same state are located remotely from each other at different nodes in a network. However, as discussed above, the two databases may be in the same physical state and may even represent the same database replicating to itself. Thus, the communication lines shown in FIGS. 2A and 2B may be merely internal data flow paths within a single computer memory, such as a bus line.

Referring to FIG. 1, the system 10 has a first node 12 comprising a first target table 14, a first audit trail 16, a first collector 18, a first consumer 20 and a restart file 22. The system 10 also has a second node 24 comprising a second target table 26, a second audit trail 28, a second collector 30, a second consumer 32 and a restart file 34. To simplify the explanation of the invention, the following terminology is used interchangeably:

first node 12—node A
first target table 14—target table A or database A
first audit trail 16—audit trail A
first collector 18—collector A
first consumer 20—consumer A
restart file 22—restart file A
second node 24—node B
second target table 26—target table B or database B
second audit trail 28—audit trail B
second collector 30—collector B
second consumer 32—consumer B
restart file 34—restart file B
combination of collector A and consumer B—primary replication subsystem
combination of collector B and consumer A—standby/reverse replication subsystem In addition to the elements above, one or both of the nodes A and B include one or more local input devices 36 and 38, referred to interchangeably as "local input device A" and "local input device B." The local input devices A and B make local modifications (e.g., inserts, updates and deletes) to the data in the respective databases A and B as part of a complete transaction in a similar manner as the application programs described in FIG. 1 of U.S. Pat. No. 6,122,630. Alternatively, the local input devices A and B may be located outside of the nodes A and B, and may be connected via a communication medium to the nodes. The local input devices A and B may be batch programs having no user or terminal I/O.

The databases A and B, audit trails A and B, collectors A and B and consumers A and B are connected together as discussed above in the definitions section. More particularly, the collector A is connected to the consumer B via communication medium 40 to provide primary replication, and the collector B is connected to the consumer A via communication medium 42 to provide standby/reverse replication.

In operation, any modifications made by the local input device A to the database A must be replicated in the database B. Likewise, any modifications made by the local input device B must be replicated to the database A.

The system 10 also includes restart files 22 and 34 connected to respective collectors 18 and 30. The function of the restart files 22 and 34 is described above in the "Definitions" section.

Figure 12:
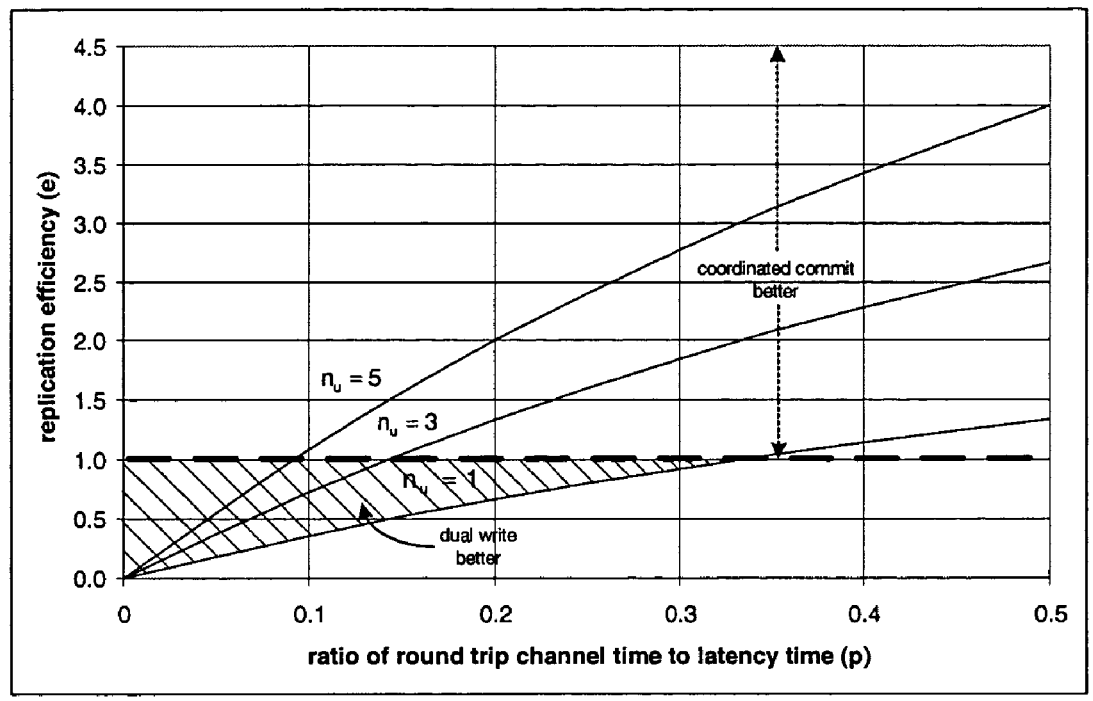
FIG. 12 illustrates replication efficiency e plotted as a function of communication channel time p for various values of transaction sizes $n_u$. The regions of excellence for dual writes and for coordinated commits are shown.

The system 10 preferably includes additional elements and steps to prevent ping ponging of transactions, in addition to elements and steps for avoiding collisions. FIGS. 3 12 of U.S. Pat. No. 6,122,630 illustrate seven transaction ping-pong prevention schemes. For simplicity, the systems described herein do not show the ping-pong prevention schemes.

As discussed above, collisions may occur in database replication schemes. If a collision is detected, discrepancies between the plural database versions must be investigated and resolved by special programs or by the system operator. The present invention provides a scheme to prevent such collisions, thereby obviating the need for such special programs or system operator intervention.

Figure 2A:
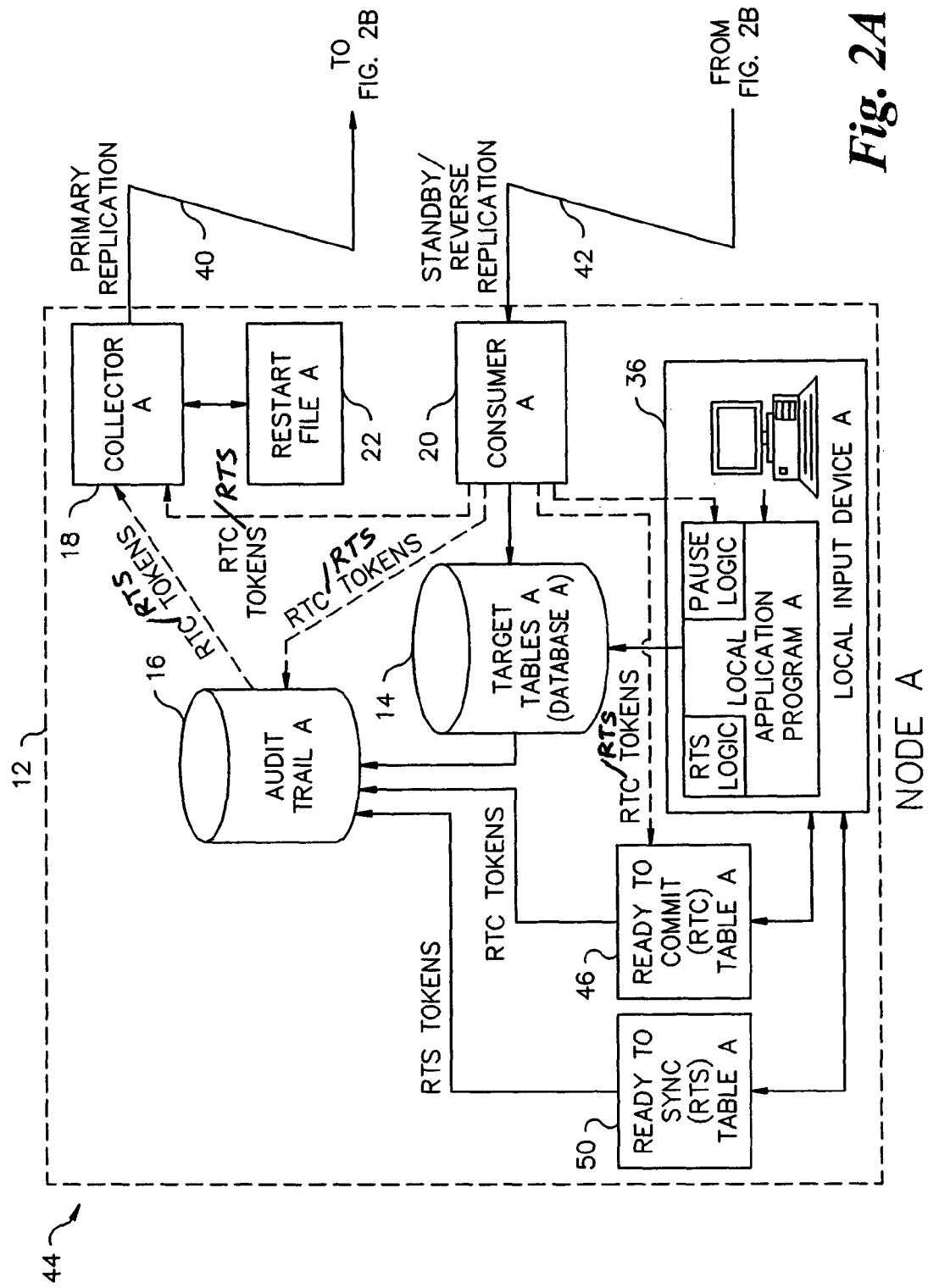
FIGS. 2A and 2B, taken together, is a schematic block diagram of a bidirectional database replication system having a collision avoidance scheme in accordance with the present invention.
Figure 2B:
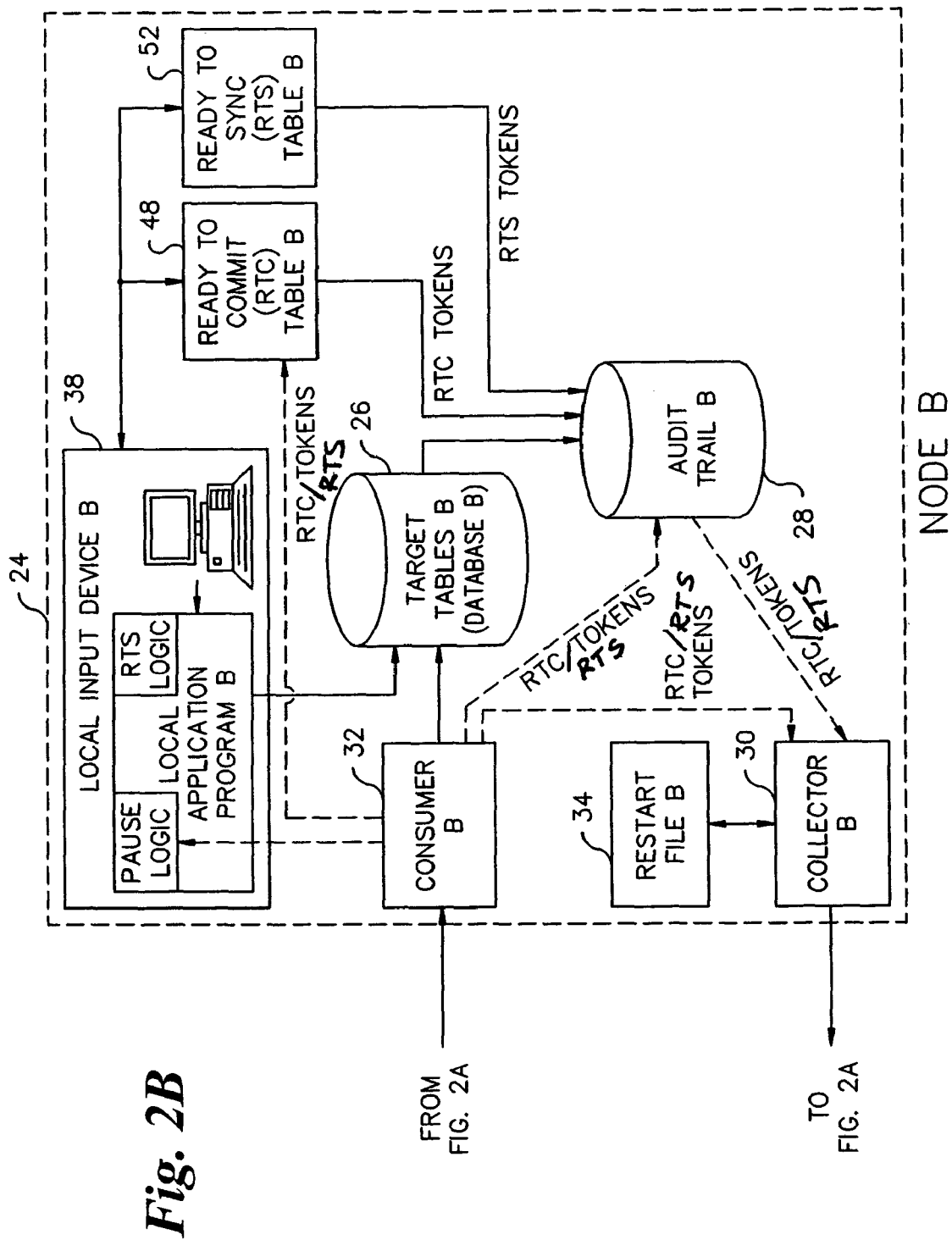

FIGS. 2A and 2B show one preferred embodiment of the present invention in the form of a system 44. FIGS. 2A and 2B, taken together, is similar to FIG. 1, except for the addition of a ready to commit table at each node, additional communication paths between the consumers and audit trails at each node, pause logic inside the local application programs, and a ready to sync table at each node (described later on in the disclosure). Specifically, node A includes ready to commit table 46 (hereafter, "RTC table A") and node B includes ready to commit table 48 (hereafter, "RTC table B"). An input of the RTC table A is connected to the output of the consumer A, and the output of the RTC table A is connected to the input of the audit trail A. The RTC table A is also in bidirectional communication with the local application program A of the local input device A. The RTC table B is connected in a similar manner to the corresponding elements of node B.

The RTC tables A and B may be separate elements of the system 44, as illustrated in FIGS. 2A and 2B, or they may be physically located in, or part of, the target tables, the consumers, or the local application programs.

FIG. 3 shows one preferred embodiment of an RTC table, here, RTC table A. The RTC table A contains indicia of transactions initiated at node A that are ready to be committed but that are not yet committed. The transactions in the ready to commit stage are paused. The RTC table A assigns and outputs a ready to commit token (hereafter, RTC token) to the audit trail A for each transaction in the table that represents a transaction initiated at node A and which is currently in the paused state. These tokens are then sent by the collector A to the other nodes in the system (here, only node B in this two node embodiment). When tokens initiated at node A are successfully returned (selectively ping-ponged) to node A, the respective transactions are completed (i.e., committed), and the respective entries in the ready to commit table are deleted. In one suitable scheme, the entries may have a flag which is initially given a first value that indicates a ready to commit state for the transaction, and is subsequently given a second value upon return of the respective token and completion of the commit operation that indicates a committed state for the transaction. The entry may then be deleted when the flag is given the second value.

The present invention is preferably implemented in conjunction with row or table locking, also referred to as row-level locking and table-level locking. The examples provided below use row locking. In multi-version data concurrency control, row-level locking is used when one or more internal fields of a row (i.e., columns) are being added, updated, or deleted. The appropriate rows are locked so that more than one user at a time cannot modify the rows of a particular table of data. The locks are released after the transaction is completed.

The present invention uses the row-level locking feature in conjunction with RTC tokens to ensure that the appropriate rows in each target table are locked before a transaction is committed at the originating node. When an RTC token is received back (returned) from each of the other nodes in the system 44, then the originating node knows that all of the other nodes in the system 44 have locked the appropriate rows and are ready to commit the transaction. Accordingly, the transaction can be committed without a risk of a collision occurring at one of the other nodes in the system 44. No such transaction pausing or RTC tokens are used in the prior art system 10.

To summarize, the return of the RTC token at the originating node from each of the other nodes in the system indicates that the corresponding rows in all of the replicated databases are locked before being updated and that the transaction may be committed without a possibility of a collision. If the RTC token fails to return or is prematurely returned with an error indication, this may indicate that a collision will occur if the transaction goes forward, and thus the transaction should not be committed.

FIG. 3 also shows an example of the contents of audit trail A and audit trail B, in conjunction with the contents of RTC table A. FIG. 3 illustrates a sample transaction having an identification number 101 wherein $10.00 is transferred from the account of John Smith to the account of Jane Doe. The transaction is started by local input device A at node A and is replicated at node B. At time t1, the local application program A begins transaction 101. The audit trail A thus includes an entry for this step. The BEGIN step is replicated to node B and thus appears in the audit trail B shortly thereafter, referred to herein as time t1+α. In some database systems, there is no separate BEGIN step. Instead, the first transaction step or transaction operation for a given transaction identifier is considered the BEGIN step. At time t2, the local application program A requests to debit $10 from John Smith's account. John Smith's row is then locked and updated in target table A and the debit operation is entered into the audit trail A. The debit operation is then replicated to node B. John Smith's row is locked and updated in target table B and the debit operation is entered into the audit trail B shortly thereafter, at time t2+α. At time t3, the local application program A requests to credit $10 to Jane Doe's account. Jane Doe's row is locked and updated in target table A and the credit operation is entered into the audit trail A. The credit operation is replicated to node B. Jane Doe's row is locked and updated in target table B and the credit operation is entered into the audit trail B shortly thereafter, at time t3+α.

At time t4, the local application program A is ready to commit transaction 101. Instead of immediately initiating the COMMIT operation, the local application program enters an indicia of transaction 101 into the RTC table A. In this example, the indicia is the transaction identifier. However, the scope of the invention includes other forms of indicia. Optionally, a flag is set for the table entry. Here, the flag is initially set to zero. As described above, a token is generated for each new RTC table entry and is automatically sent to the audit trail A. Thus, at approximately time t4, RTC token 101 is entered into the audit trail A. The RTC token 101 is sent to node B using the same conventional replication processes that replicate transaction steps or operations.

Upon receipt by the consumer B at node B of the RTC token 101, consumer B determines whether the appropriate transactions steps or operations that should have been received at node B prior to a commit operation were, in fact, received at node B. In this instance, it must be verified that the debit and credit transaction steps for John Smith and Jane Doe were received at node B, and therefore, their respective rows have been locked and updated. If so, the RTC token 101 is entered into the audit trail B at time t4+α. Optionally, if no audit record is needed of RTC tokens received at node B, then the RTC token 101 may be sent directly from the consumer B to the collector B without being entered into the audit trail B. In this embodiment, there would be no entry in the audit trail B shown in FIG. 3 at time t4+α. This alternative scheme is represented by the dashed lines in FIG. 3 that connect the consumers and collectors. Since there is no entry in the audit trail B, this alternative scheme may be used when restart and sequencing issues do not arise.

Assuming that the RTC token 101 successfully makes it to the collector B, either directly from consumer B or from the audit trail B, then at time t5, the collector B sends the RTC token 101 back to node A where it is received by the consumer A. At approximately time t5, the consumer A sends the RTC token 101 (or an indicia of transaction identifier 101) to the RTC table A. In the RTC table A, the flag for transaction identifier 101 is changed from zero to one, thereby indicating that the RTC token has been received at all nodes that must replicate the transaction, here only node B.

Alternatively, at time t5, the consumer A may send the RTC token 101 directly to the pause logic of the local application program A, which, in turn, communicates with the RTC table A regarding which transactions are waiting to commit and which transactions can go forward with a commit step.

At time t6, the transaction 101 is committed. The commit step is entered into the audit trail A and is replicated to node B for entry into the audit trail B at time t6+α. The row locks for John Smith and Jane Doe in the target tables A and B are removed after the commit step is completed.

Also, at time t6, the table entry for transaction 101 may be deleted from the RTC table A. If table entries are not automatically deleted, then logic in the RTC tables is provided to prevent RTC tokens from being generated for any table entries that have a flag value equal to "1" or to prevent RTC tokens from being generated more than one time for each unique transaction identifier.

The consumers must process RTC tokens differently depending upon whether the tokens were originated from the consumer's own node or from another node. As described above, tokens that were not originated at the consumer's own node may be sent directly to the collector at the same node (after appropriate logic is executed to ensure that a token return is permissible), whereas tokens that were originated at the consumer's own node must be processed by the pause logic and ready to commit table of the same node to ensure that the transaction is committed if tokens from all other nodes are subsequently returned.

When a consumer receives an RTC token from a node other than its own node, the consumer must verify whether the appropriate transactions steps or operations that should have occurred prior to a commit operation have, in fact, been received and successfully applied at the consumer's node. In the example above, consumer B must verify that the debit and credit transaction operations were actually received and successfully applied at consumer B, and therefore the rows for John Smith and Jane Doe in target table B have been properly locked and updated. One suitable technique for accomplishing this task is to examine packet sequence numbers.

In the example above, the data packets for the BEGIN, DEBIT, CREDIT, COMMIT operations or steps, and the RTC tokens, will have sequential numbers for the respective transaction identifier. For example, one simplified example of numbers is as follows:

BEGIN—101.001
DEBIT—101.002
CREDIT—101.003
RTC TOKEN—101.004
COMMIT—101.005

In this example, when the consumer B receives the RTC token 101, the consumer B verifies whether sequence numbers 001 through 003 for transaction 101 were received. If so, then the consumer B can forward the RTC token 101 back to the originating node, here, node A if sequence numbers 001 through 003 have been successfully applied. If not, then the consumer B will not forward the RTC token 101 back to node A and the transaction will not be completed at either node. Alternatively, the consumer B will forward back the RTC token with an indication of failure attached thereto. This RTC token would be treated by the originating node as if the RTC token never returned. By preventing transactions from going forward if the appropriate rows or tables are not locked at each replicated database, collisions can be avoided.

If a flag is used in the RTC table, schemes other than the simple two logic stage flag are within the scope of the present invention. For example, the flag may represent the number of other nodes that the originating node must hear back from before committing the transaction. The flag may then be counted down to zero as tokens are returned.

To summarize some of the various different ways that a node processes incoming RTC tokens, as opposed to RTC tokens associated with locally initiated transactions, three different paths are shown in FIGS. 2A and 2B. First, the RTC tokens may be sent directly to the collector of the node after determining that the node is prepared for a commit operation for the transaction corresponding to the RTC token. Second, the RTC tokens may be sent to the RTC table at the node after determining that the node is prepared for a commit operation for the transaction corresponding to the RTC token. In this embodiment, the RTC token would pass through the RTC table at the node and be entered into the audit trail at the node. The RTC token would not be stored in the RTC table at the node, since the transaction was not initiated at the node. Third, the RTC tokens may be sent directly to the audit trail at the node after determining that the node is prepared for a commit operation for the transaction corresponding to the RTC token. The second and third embodiments allow the system to take advantage of the existing capabilities of the audit trail to replicate any entered transaction steps or operations to other nodes. In this manner, the RTC token may be treated by the audit trail just like any other transaction step or operation. In the first embodiment, additional instructions must be provided in the collectors regarding the processing of RTC tokens. Also, in the second and third embodiments wherein the RTC token is in the audit trail, serialization and proper sequencing of the database operations (both used for a restart operation) are ensured.

In an alternative embodiment of the present invention, the RTC token may be combined, either logically or physically, with the last transaction step or operation. This alternative embodiment may be used in an audited or an unaudited (non-transactional) database scheme.

Referring again to FIG. 3, transactions do not have to start and finish in sequence. For example, a transaction 102 may start after transaction 101 has begun, but before transaction 101 has been committed. Thus, there may be more than one uncommitted transaction at any point in time at each node, and thus more than one entry of an RTC transaction in the RTC tables at any one point in time.

To minimize unnecessary traffic in the communication lines between nodes, particularly in a system that has more than two nodes, logic is preferably provided in the consumers, collectors or audit trails to direct returning tokens only to the originating nodes (a form of selective ping-ponging). Accordingly, the packets that include RTC tokens also preferably include node origin information. To further minimize unnecessary traffic, logic may be provided in the consumers, collectors or audit trails to selectively block the ponging of commit transactions, since the ponging of RTC tokens may be used as a surrogate for a commit transaction.

Logic is also preferably provided in the consumers, collectors or audit trails to prevent ping-ponging of RTC tokens. Any of the schemes described in U.S. Pat. No. 6,122,630 may be used for this purpose.

In an alternative embodiment of the present invention, the RTC token is supplemented by one or more Ready to Sync (RTS) tokens which are created and propagated through the system 44 in a similar manner as the RTC token.

Some transactions have a very large number of steps or operations. As the succession of transaction steps or operations are performed, resources are allocated and data is locked. As the transaction approaches the commit operation, a large number of resources and data may be allocated and locked. These resources and data are not available for other transactions that may be occuring or waiting to occur. When using only the RTC token, the system 44 must wait until just before the commit operation to discover whether a collision would occur if the transaction is committed. It would be desirable if the system 44 can discover at an earlier stage in the transaction whether a collision may occur so that the transaction can be aborted earlier in the process, thereby freeing up system resources and locked data earlier in the process. The longer the transaction, the greater the advantage in detecting problems earlier in the transaction. It would also be desirable to know if certain parts of lengthy transactions have been safe-stored at all nodes.

To implement this alternative embodiment, selected intermediate points in a transaction are designated as checkpoints or restart points (hereafter, "sync points"). A sync point may occur after every N transaction steps or operations, or at selected significant transaction steps or operations. At each sync point, indicia of the transaction initiated at the originating node is entered into a Ready To Sync (RTS) table 50 or 52, hereafter, RTS table A and RTS table B shown in FIGS. 2A and 2B. The RTS tables A, B are similar in concept to the RTC tables A, B used for RTC tokens. The RTS tables A, B generate RTS tokens for each sync point, in a manner similar to generation of RTC tokens by the RTC tables A, B. The RTS tokens propagate through the system 44 in a similar manner as the RTC tokens (not shown in FIGS. 2A and 2B). When using RTS tokens, it is not necessary to pause the transaction to wait for a successful return of the RTS tokens from the other nodes before continuing with additional transaction steps or operations. Thus, there may be more than one RTS token propagating through the system 44 at one time for each transaction. Each RTS token is transmitted in sequence by the originating node collector. However, in an optional embodiment of the RTS scheme, the transaction may be paused to wait for a return of the RTS tokens from all nodes. The RTS tables A, B and the consumers A, B may use any of the schemes described above with respect to the RTC tables A, B, such as flags and sequence numbers, to track and monitor the sync process.

The RTS tables A, B may be part of the RTC tables A, B. The RTC tables A, B may be separate elements of the system 44, as illustrated in FIGS. 2A and 2B, or they may be physically located in, or part of, the target tables, the consumers, or the local application programs.

If a failure is detected that is indicative of a potential collision situation for the transaction up until the sync point (e.g., if all of the RTS tokens do not properly and/or timely return from the other nodes), then the transaction is stopped by logic in the local application program. Two types of transaction stopping are possible. In one mode, the entire transaction is aborted as described above when only an RTC token is used in a pause-before-commit process. In another mode, the transaction is restarted right after the last successful sync point. Since the transaction may be very lengthy, the ability to restart the transaction at an intermediate point has advantages over the all-or-nothing approach when using only an RTC token in a pause-before-commit process. In either mode, the use of RTS tokens allows the system 44 to provide earlier detection of collision situations, thereby allowing system resources and data files to be released and unlocked earlier in the transaction process. The use of the RTS tokens also allows the system 44 to know if certain parts of lengthy transactions have been safe-stored at all nodes.

The present invention may be implemented using column-level locking, row-level locking, page-level locking, or table-level locking. The type of locking depends upon the desired granularity level (i.e., the size of the object to be locked). The lowest granularity is at the column level, whereas the highest granularity is at the table level. Generally, the lower the lock granularity, the greater the number of users that can simultaneously access data in the table, because a smaller portion of the data is locked by each user.

The scope of the present invention is not limited to relational database management systems (RDBMS) having tables, rows and columns, but also includes corresponding elements in traditional, relational and conceptual data management systems, summarized as follows:

RDBMS: table, row, column
Traditional: file, record, field
Relational: relation, tuple, attribute
Conceptual: entity set, entity, attribute The present invention may also be implemented using data locking schemes other than direct row or table locking of the target tables. In one alternative embodiment, a lock table is maintained separate from the database manager locking scheme that directly controls the target tables. In this embodiment, updates (write requests) must go to the separate lock table first to check whether a row of a target table can be modified.

In some topologies, each node is not directly connected to every other node in the system, but instead indirectly communicates with some other nodes through other nodes. The scope of the present invention includes such topologies wherein RTC tokens and transaction data from an originating node are communicated to and from one or more receiving nodes via other nodes.

The present invention has significant advantages over distributed transaction schemes that also provide a degree of collision prevention, such as Oracle's two-phase commit. In the present invention, database replication is handled by elements and software that are independent of the elements and software that process locally initiated transactions and that post transactions to databases. In contrast, Oracle's two-phase commit scheme places all of these burdens on the local application software and transaction coordinator at each node. The present invention may be implemented with less node coordination than the Oracle scheme, and with more efficient communication medium usage (for example, via blocking), thereby allowing for faster speed and greater throughout. Additionally, the two-phase commit scheme starts one "global" transaction on the initiating node, and information about this transaction must be propagated to the other "child" nodes. The initiating node, as well as the child nodes, must communicate significant information about the state of the global transaction as the transaction is replicated and eventually terminated. This overhead is not required in the present invention, as each side performs its own local transaction independent of the other.

Figure 4:
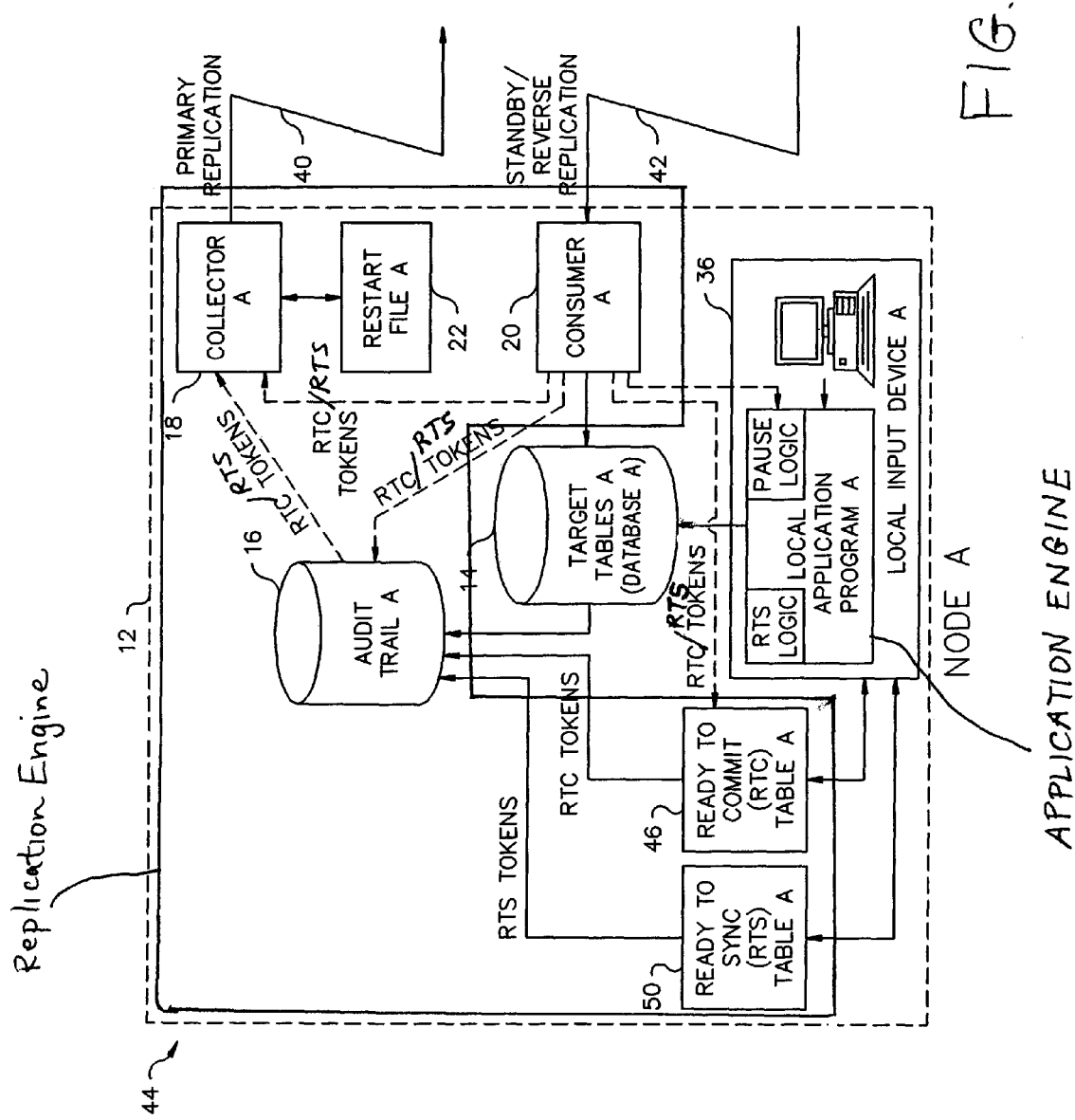
FIG. 4 shows a schematic block diagram of one half of the system of FIG. 2A highlighting that the replication engine is a separate and distinct entity from the application engine.

C. Collision Avoidance—Replication Engine and Application Engine are Independent from Each Other FIG. 4 further illustrates one significant difference between the present invention and Oracle's two-phase commit scheme. FIG. 4 is similar to FIG. 2A which shows the elements of node A in a bidirectional database replication scheme. In the present invention, the replication elements which perform data replication functions are referred to collectively as a "replication engine." The elements which execute transactions and post the transactions to a database are referred to collectively as an "application engine or application." In the preferred embodiment of the present invention, the replication engine is independent of the application. In contrast, Oracle's two-phase commit scheme does not rely upon a replication engine that is independent of the application. More specifically, in Oracle's two-phase commit scheme, the local application software is integrally involved in the replication process.

As described previously, the two-phase commit scheme is integrated into the application for replicating the application's changes as those changes are made. This degree of tight coupling is not required in the present invention, as the source and target transaction steps occur independently, not gated by the speed of each other, and are only synchronized when the RTC token is sent/processed. Additionally, the transaction coordinator in the two-phase commit scheme sends messages via separate channels/connections from the data, causing additional coordination between these channels, whereas the present invention doesn't have this additional coordination as it uses the same channels for the RTC tokens as the data.

In operation, the replication process functions in the following manner:

1. An application at a first node pausing each transaction being executed in a source database at the first node prior to a commit operation for the transaction.

2. A replication engine at the first node assigns a ready to commit token to the transaction in coordination with the application.

3. The replication engine at the first node sends the ready to commit token to the second node.

4. A replication engine at a second node determines whether a target database at the second node is prepared for a commit operation for the transaction corresponding to the ready to commit token, and, if so, sends back the ready to commit token to the first node.

5. The application at the first node executes a commit operation at the source database in coordination with the replication engine only upon receipt from the second node of the ready to commit token originally sent from the first node. In an alternative embodiment, the replication engine executes the commit operation at the source database only upon receipt from the second node of the ready to commit token originally sent from the first node.

For reasons of clarity, the descriptions of the present invention describe the application and replication engine as processing one transaction at a time, whereas in a typical implementation these components would be "multi-threaded", that is, able to process many transactions simultaneously.

Figure 5A:
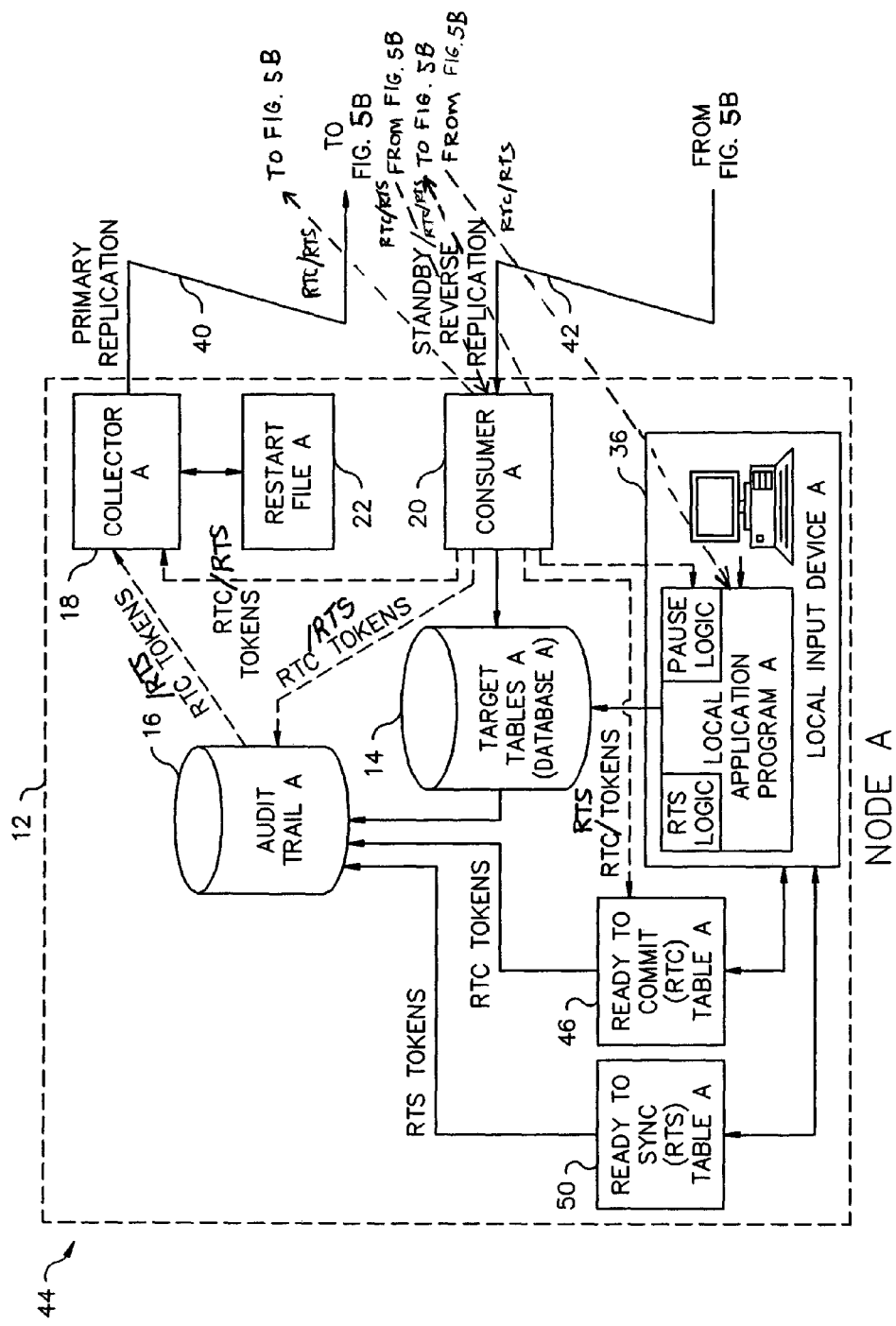
FIGS. 5A, 5B, 6A, 6B, and 7A, 7B each taken together, are a schematic block diagrams of the system of FIGS. 2A and 2B, further defining additional paths (5A, 5B and 6A, 6B only) and back channels (7A, 7B only) that the RTC and RTS tokens can take as they flow through the system.
Figure 5B:
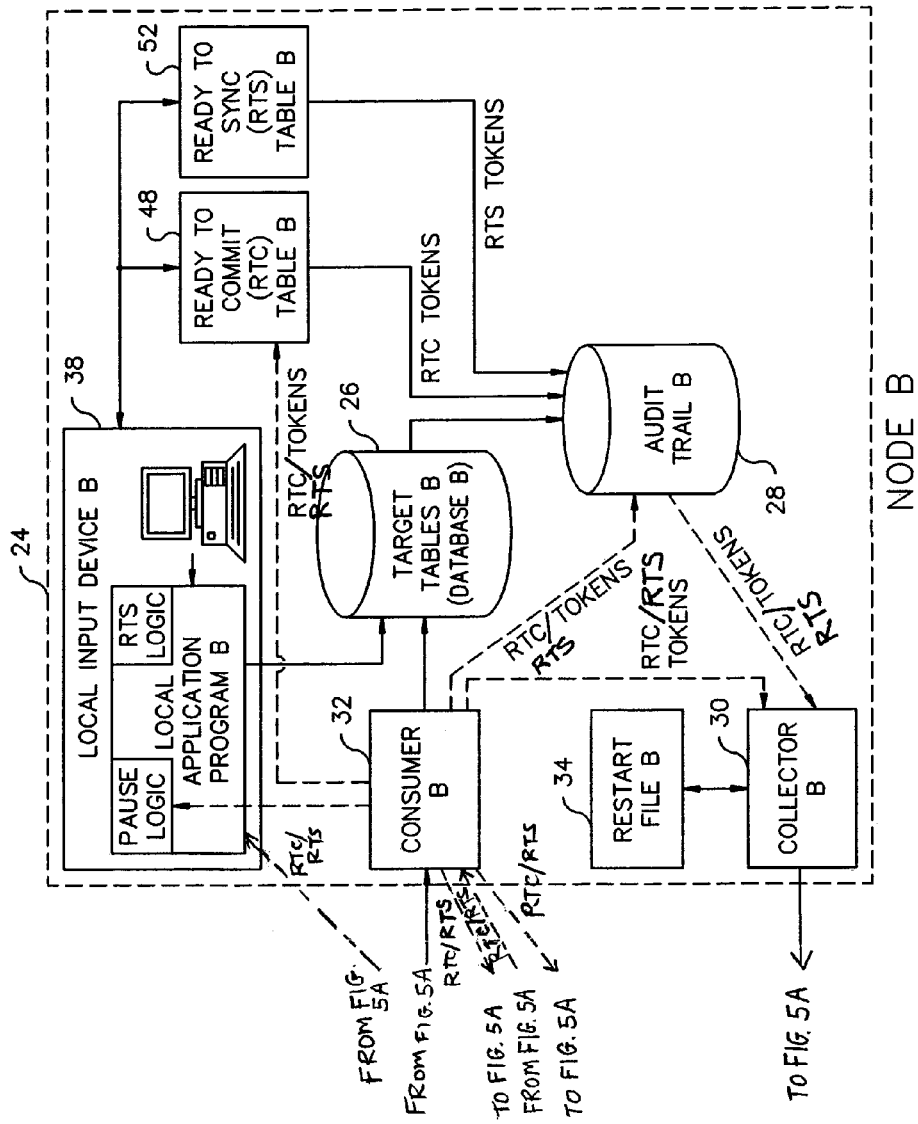
Figure 6A:
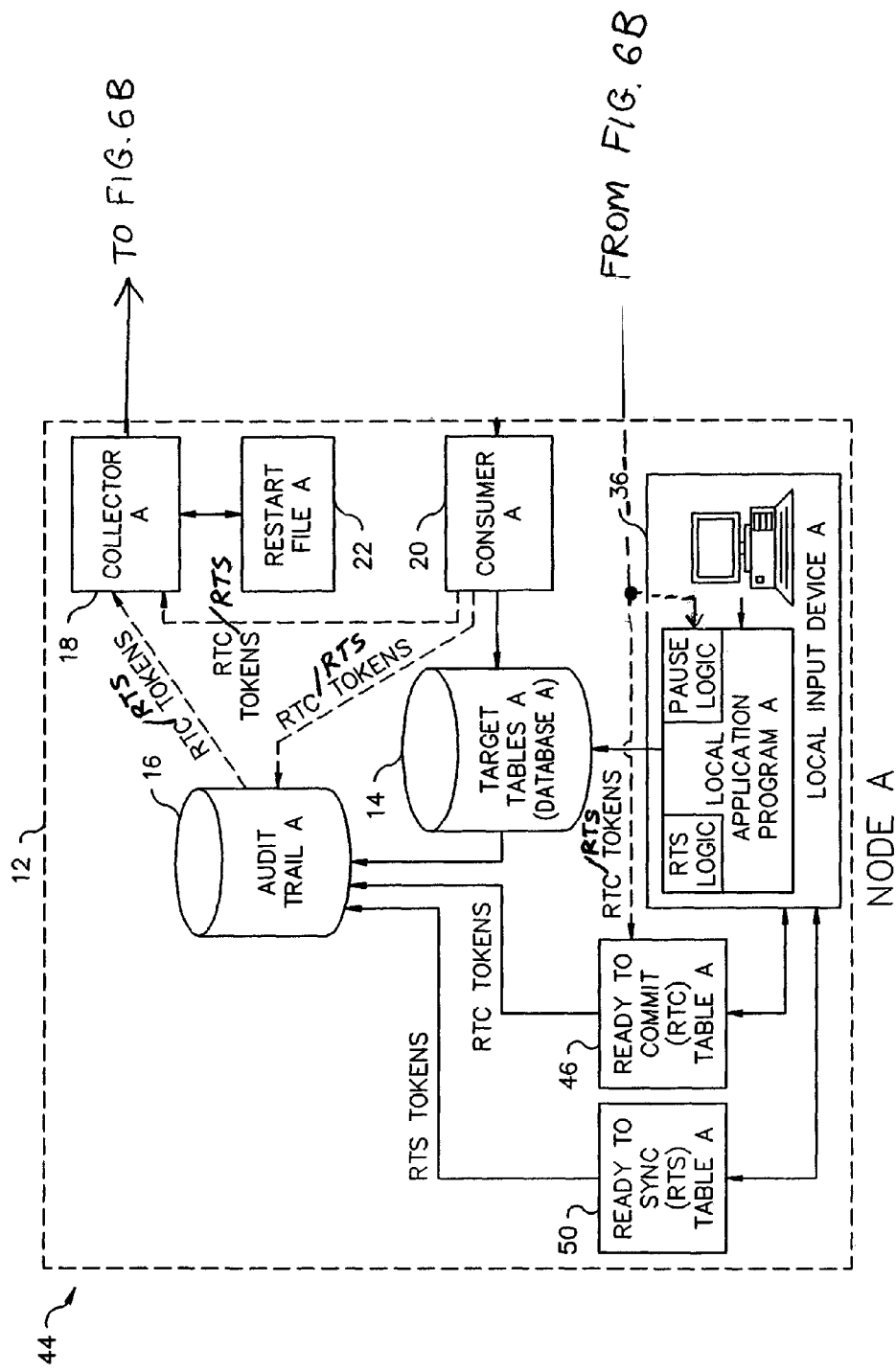
Figure 6B:
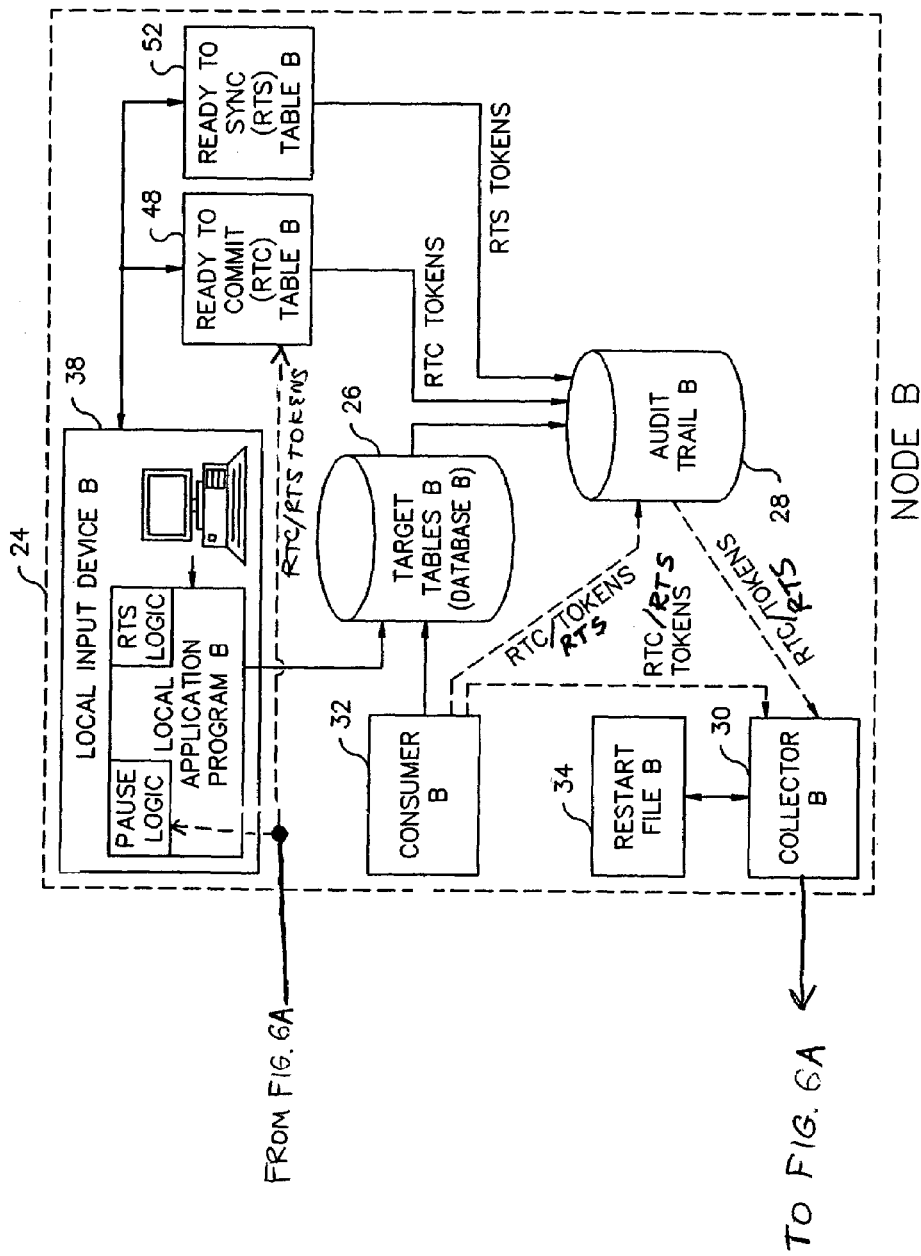
Figure 7A:
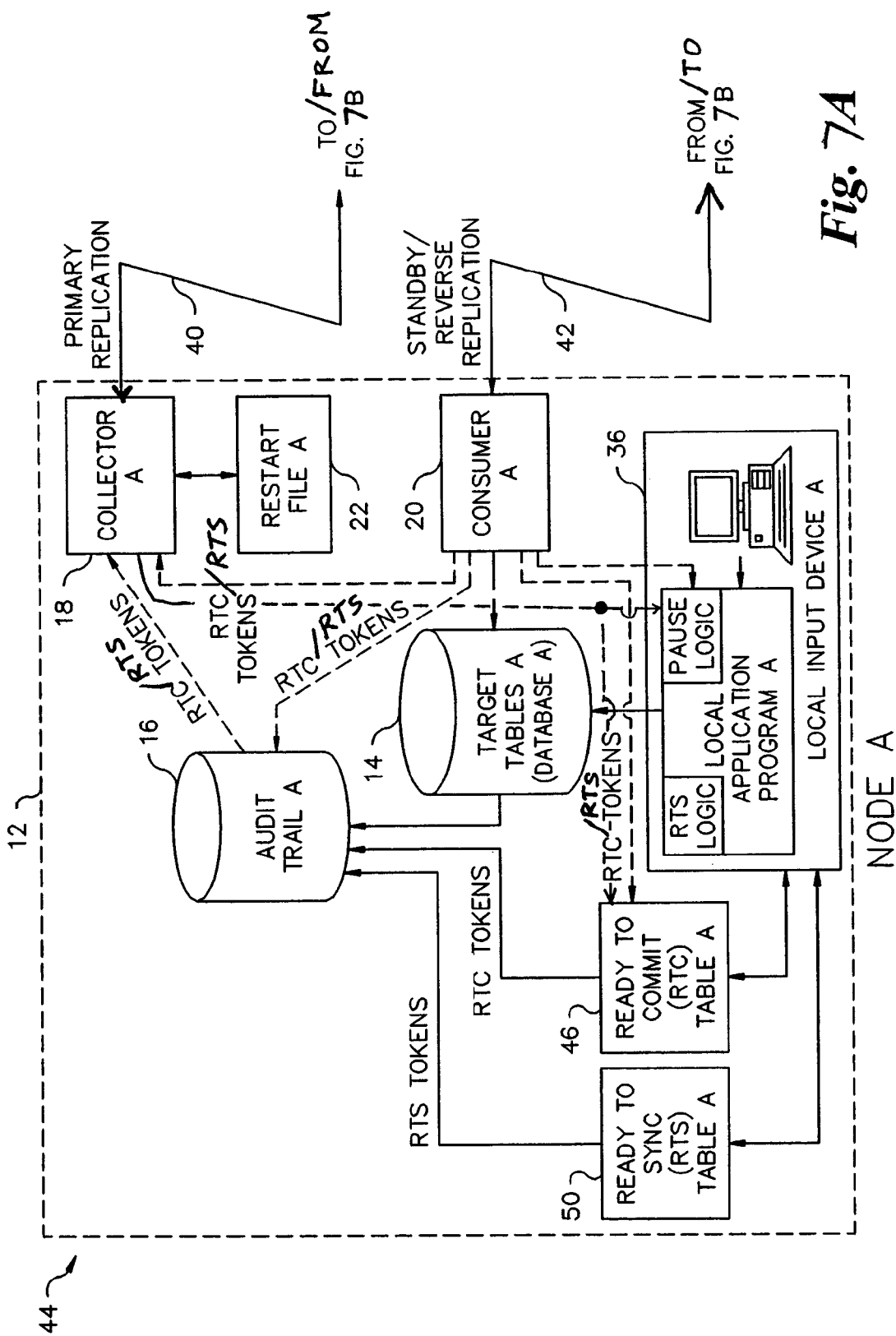
Figure 7B:
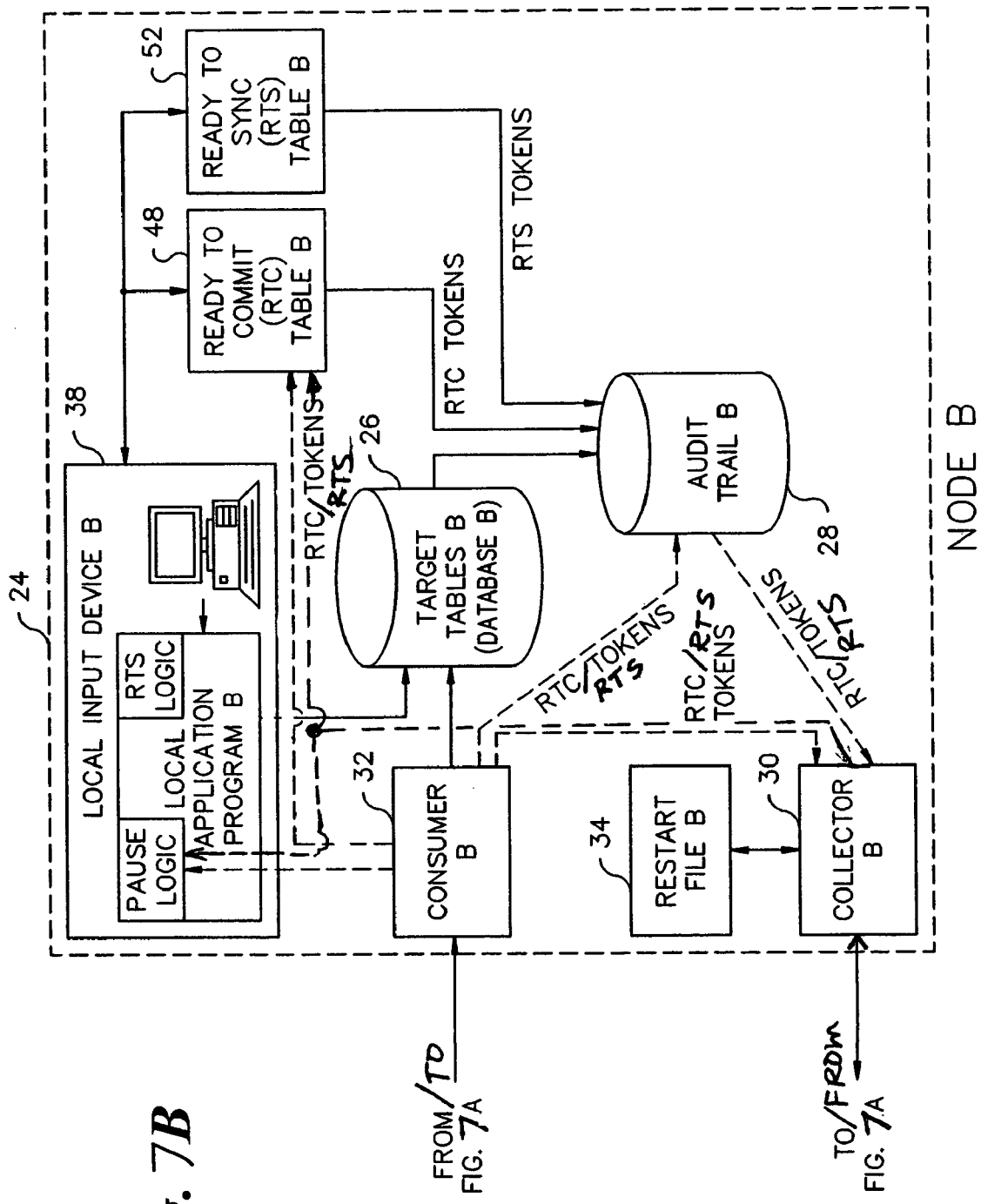

D. Collision Avoidance—RTC/RTS Tokens Flow Directly Through Consumers, Bypassing Audit Trails FIGS. 5A and 5B show an alternative embodiment of the present invention wherein the RTC tokens and RTS tokens flow directly through the consumers A and B, bypassing the audit trails A and B. FIGS. 5A and 5B are similar to FIGS. 2A and 2B, except for four extra data flow lines between consumer A and local application program B, consumer B and consumer A, consumer A and consumer B, and consumer B and local application program A. Additional data flow lines also exist, but are not shown, between RTS table A and consumer A, and RTS table B and consumer B to communicate the RTS tokens to the respective consumers. In this embodiment, when the appropriate consumer knows of the disposition of an RTC token or RTS token (i.e., when the RTC or RTS token is returned), the consumer can directly send the RTC or RTS token back to the originating application either directly, or via the originating node's collector or consumer. FIGS. 6A, 6B and 7A, 7B show examples of such embodiments.

E. Collision Avoidance—Less than all Nodes Return RTC Token

In the preferred embodiments of the present invention described above, the commit operation is executed at the originating node only upon receipt from each of the other nodes in the system of the ready to commit token originally sent from the originating node for the transaction. In an alternative embodiment of the present invention, the commit operation is executed as long as the originating node receives back a ready to commit token from at least one of the other nodes, or a specified subset or number of the nodes. This alternative embodiment is useful so that the scheme can recover from certain failures, such as the loss of the interconnecting communications media or the loss of an entire system. For example, if the token is not returned within a specified time period, or if the communication interconnections or other nodes suffer from irrecoverable errors, the originating node can still commit the transaction, mark the failed or inaccessible nodes as "inaccessible", and remove them from the network. This allows the remaining nodal network to survive the failure and continue to process inputs.

As described below, the inaccessible nodes can later be recovered and re-added into the network using a variety of techniques.

F. Collision Avoidance—Commit to Originating Database Last

In the preferred embodiments of the present invention described above, the commit operation is executed at the originating node (source database) first, and then replicated to the other nodes (target databases). That is, the transactions are first posted to the originating database (upon receipt at the originating node of the RTC tokens), and then the posted transactions are replicated to the other nodes for posting to their respective databases. However, in an alternative embodiment of the present invention, the commit operation is executed first at the other (non-originating or target) nodes, and then second, at the originating or source node.

More specifically, in this alternative embodiment, the transaction operations or steps are still applied to the source database, and replicated to the target database, as they occur, and the application is paused at commit time. The RTC token is then sent to the target side, and if all of the transaction was successfully applied, the target side commits the transaction, and returns the RTC to the originating node. Upon receipt of the RTC, the source side then commits the transaction. In this technique, the target database achieves the commit state sooner than it otherwise would since it doesn't have to wait for the source to commit first, and one less transaction operation (the commit from the source to the target) needs to flow, thereby improving the overall transaction processing rate of the entire system.

In systems with two or more nodes (or replication communication paths between the nodes), any combination of these techniques (source commit first then target vs target commit first then source) can be used. These techniques can be assigned on a replication path by path basis. For example, in a system with three nodes A, B, C, all interconnected with replication paths (i.e., a path from A→B, a path from A→C, a path from B→C, a path from B→A, a path from C→A, and a path from C→B), the path from A→B could use the source then target commit technique, with the remaining paths using the target then source commit technique.

G. Collision Avoidance—Initially Send Only Key to Target

Each record or "row of data" in a database has an associated key, also referred to as a "primary key," which uniquely identifies the record or row of data. The key is typically defined as one or more of the fields in the record, although the key could be a record's relative or absolute position in the file, or represented by the location, sequence, timestamp, or entry/arrival of the record in the file. Accordingly, the byte size of the key is typically substantially shorter in length than the byte size of the entire record and thus takes up less communication bandwidth. Furthermore, a key may be used to read and lock a record much quicker than a corresponding I/O operation on the record which requires a time-consuming write operation. These principles may be used to implement a highly efficient database synchronization process.

Consider the following source/target replication process that sends all of the record information, and performs the entire I/O operation, as the data arrives:

1. BEGIN transaction step for record n at source database.

2. Send the key for record n and the associated record data to the target database.

3. Use the key and the associated record data to lock and update the appropriate record in the target database. This process requires I/O operations, and thus time-consuming write operations (e.g., inserts, updates, and deletes), to be performed at the target database.

4. Pause the source's commit operation.

5. Send an RTC token to the target database and use the RTC token to determine if the appropriate record was locked and updated. If so, return the RTC token to the source database.

6. Upon receipt of the RTC token at the source, perform a COMMIT operation at the source.

Consider now an alternative embodiment of this process.

1. BEGIN transaction step for record n at source database.

2. Send only the key for record n to the target database. No associated record data is sent at this time.

3. Use the key to lock the appropriate record in the target database. This process does not require any write operations to be performed at the target database.

4. Pause the source's commit operation.

5. Send an RTC token to the target database and use the RTC token to determine if the appropriate record was locked. If so, return the RTC token to the source database. The RTC token is effectively double-checking to see if the previously sent key did its job.

6. Upon receipt of the RTC token at the source, send the associated record data and perform a COMMIT operation at the source.

7. As the associated record data and commit arrive in the target, update the locked records, and ultimately apply the commit.

In the alternative embodiment, the source does not have to wait for data write operations at the target. Instead, the source only has to wait for RTC token to come back which tells the source that the appropriate records have been locked and no collision will occur.

In another alternative embodiment, the source starts sending the record key information as it is collected, and sends the record data information as communication bandwidth becomes available, rather than waiting for the RTC to return. In this approach, the record key information takes precedence over the record data information when deciding what to send to the target (although the approach needs to insure that the record data information eventually gets sent). As the record key information arrives in the target, the target locks the records as described above, and if any record data arrives and the target has available processing bandwidth, the target applies the write operations as processing capacity allows (in the target, the record key lock operations takes precedence over the record data write operations). In this embodiment, parallelism between sending and processing the record key and record data information is achieved, possibly allowing for a reduced overall processing time and greater communication bandwidth utilization.

H. Synchronous Replication Vs. Asynchronous Replication

In a "synchronous replication" scheme, an application executes transactions at a source database in coordination with the ability of a replication engine to replay those transactions against a target database. This is referred to as the application and the replication engine being "tightly coupled", or operating inter-dependently. The net result is that the source database and the target database are either both updated with the transactional data or neither is updated with the transactional data. This is referred to as making the source and target database updates for the transaction "atomic." Most of the RTC token schemes described above implement synchronous replication, although the systems may be implemented so that the transactions are not necessarily synchronous. For example, the RTC may be sent in parallel or combined with the source side commit being allowed to complete, whereby the return of the RTC indicates that the transaction has been applied and safestored in the target. This approach is useful when data collisions are not inherent or are not important in the application, yet the sending system wants to know that the transaction was applied into the target database. (The sending system may, or may not, pause the application that initiated the transaction until the RTC token is returned, depending on application requirements).

In one preferred embodiment of synchronous replication, a commit operation that occurs at the source database is posted first to the source database and is then propagated by the replication engine at the source for posting to the target database. The opposite scheme is also within the scope of this definition. In synchronous replication jargon, committing a transaction at the source database is similar to sending a local I/O complete signal.

In an "asynchronous replication" scheme, an application executes transactions at a source database without coordination of the replication engine's ability to replay those transactions against the target database. This is referred to as the application and the replication engine being "loosely coupled," or operating independently. Thus, there may be queues of committed transactions at a source database that have not yet been even begun at the target database. The replication schemes described in U.S. Pat. No. 6,122,630 are asynchronous. Asynchronous replication, also referred to as "store-and-forward," may be periodic (replications are executed at specific intervals) or aperiodic (replications are executed only when necessary, such as when a triggering event occurs). In asynchronous replication jargon, data does not have to be written to the target database (remote site) before the local I/O completes, or the local transaction is allowed to complete.

The advantages and disadvantages of synchronous and asynchronous replication schemes are well-known. Generally, synchronous schemes provide better data integrity between two databases that need to be kept in sync. Asynchronous schemes provide a faster response time since a source or originating database does not need to wait for a return signal from the target or replicated database (which may also have to perform a time-consuming write operation) before committing a transaction. Other well-known advantages and disadvantages exist but are not discussed further.

I. Replication Vs. Synchronization

As discussed above in the Definitions section, replication relates to duplicating the contents of at least a portion of data records held in a source database to a target database. In contrast, synchronization (or database synchronization) relates to managing changes in multiple database files to assure that "changes" made in one file are distributed to all files in a structured manner. The synchronization process must also detect and resolve collisions (i.e., multiple changes to the same data field) in a structured manner. Synchronization may be synchronous or asynchronous.

J. Unidirectional Vs. Bidirectional Replication

As described above, the RTC design can be used in bidirectional replication environments where an application is "active", that is receiving inputs and initiating transactions, on both nodes. It is also useful in unidirectional environments (e.g., where an application is active on only one of the nodes) for keeping the two databases synchronized, and consistent.

In a two-node example of a unidirectional environment, a source system is replicating to a target system. The application is only active on the source. The replication data, along with the RTC's (and optionally RTS's), flow from the source to the target, and the RTC's (and optionally the RTS's) flow back. Each transaction is either committed on both systems, or neither.

This is a very valuable form of replication in some disaster recovery situations. For example, when each transaction is conveying a large amount of stock shares, currency amounts, or commodity baskets, the user may very much want to know that the transaction was safe-stored and can be committed on the target before allowing the source to commit. Alternatively, the design could commit the transaction on the target first, then commit it on the source as described above. Data collisions aren't an issue in this case, as only the source system is receiving inputs.

Adding the reverse replication path into this simple example, to create a bidirectional replication system, is a more complicated example of unidirectional replication. As described above, an application is active on each system, the two replication engines independently provide the benefits described for the unidirectional case, and RTC's prevent application data collisions between the application access to its copy of the data.

K. Collision Avoidance—Allows Application Scaling Across Nodes Resulting in a Dramatic Increase in System Availability One significant benefit of the present invention is that the application can now be "scaled" across many nodes (that is, the application can run on all of the interconnected nodes). This is known as "application domain independence," because the application is not limited to run on one specific, or set of specific, nodes.

In such a system, one can send the system inputs to any node (and/or split the inputs across the nodes in explicit or arbitrary fashion), because all nodes will perform the same sequence of work on the data, resulting in the same results, plus keep all other copies of the database in sync with those results. Prior to this technique, one had to be careful to send all associated or interrelated inputs to the same node for processing to avoid possible collisions. This prior method is known as "data content" routing of the inputs.

An additional benefit to scaling the application across two or more nodes is that now the availability of the application increases dramatically. For example, it can be shown that one can easily double the 9's in the availability of the entire system (e.g., a 0.99 available system goes to 0.9999, a 0.999 available system goes to 0.999999) by adding an additional node.

In other words, by scaling the application across multiple nodes, one gets disaster tolerance and recovery prebuilt into the architecture. Also, there is instantaneous (or near instantaneous) recovery from a catastrophic system failure since the surviving node was already processing inputs, and can continue to do so after the failure. In addition, any incomplete and new inputs that were intended to be routed to the failed node can be re-routed to the surviving node(s) instead since the surviving node(s) has all pertinent database information because its copy of the data is up-to-date.

L. Blocks of Transaction Steps or Operations

The Shadowbase replication engine queues transaction steps or operations and then sends them in blocks of data to the other nodes for replication. That is, one block of data typically consists of a plurality of transaction steps or operations. Consider the following consecutive string of transaction steps or operations.

BEGIN
. . .
A=B+7,
write rec 1
C=D+3
Write rec 2
. . .
COMMIT

In this sequence, one block may be designated as the portions:

A=B+7,
write rec 1
C=D+3
Write rec 2

Or, alternatively, the block may contain just the specific database I/O changes (such as the write operations), along with the transactional boundary information (e.g., BEGINs, COMMITs, ABORTs, etc).

Queuing and blocking of transaction steps or operations allows communication channels to be used efficiently by minimizing transmit cycles. It would be desirable to use the queuing and blocking scheme in other database synchronization and replication environments.

M. Relative Vs. Absolute Transaction Steps or Operations; Sub Record Collisions

"Absolute" transaction steps or operations specify the value to be assigned to the data. For example, assign the QUANTITY field a value of 100.

"Relative" transaction steps or operations supply a modifier to be applied to the data, to arrive at the final value. For example, modify the QUANTITY field by adding or subtracting 50.

Relative change information can be obtained via many methods, for example:

a) Capture the transaction step or operation, as in "add $10 to the PRICE field".

b) Capture and compare the data "before" and "after" values extracted from the transaction audit trail (assuming the audit trail contains the before and after image). In this case, a PRICE field before value of $90 and an after value of $100 yields a +$10 difference.

At the sub-record (i.e., field or sub-field level), collisions may not occur if they do not update the same field data in the record. For example, if one node modifies FIELD1 of a record ("record 1") while another node simultaneously updates FIELD2 of the same record ("record 1"), a collision does not occur as long as the granularity of the change that is applied to the other database is at the field or sub-field level. This form of collision resolution is acceptable as long as the combination of the new fields (new FIELD1 and FIELD2 values), along with the remaining record data, does not violate a referential integrity constraint or other business rule.

Absolute and relative change information is quite valuable for resolving certain types of collisions, e.g., those that can occur when two nodes are receiving inputs and later need to be re-synchronized. Using a relative data change example on numerical data, the relative changes can just be added/subtracted across the nodal copies of the data to get at the correct final value. For example, for bank account withdrawals, the same account can be updated on multiple nodes by separate withdrawals, just apply the withdrawal delta amounts to the account balances across all the nodes to get at the final 'correct' balance. This example illustrates that while you can ultimately resolve all of the collisions to the correct final value, you may potentially violate interim "business logic" rules. Again using the above example, assuming there is a bank business rule to avoid "overdrafting" the account, while all of the individual withdrawals at each node may not violate the rule, the aggregate of all of the withdrawals may. Hence, when replaying all of the individual steps from each of the nodes, one may need to execute the business logic functionality to check for exceptions.

FIG. 8 shows a table that describes an example of how to do relative change collision resolution/fix-up for a numerical account balance scenario, with two nodes, A and B, currently synchronized using bidirectional synchronous replication. In the example, each copy of the account initially contains $1000.

N. Replicate Blocks of Transaction Steps or Operations with Synchronous Replication One preferred embodiment of the present invention uses transaction blocks in a database replication system. Each system includes a plurality of nodes connected via communication media in a topology. Each node includes a database and a transaction transmitter which sends selected transactions posted to the database to one or more other nodes. Each transaction is one or more transaction steps or transaction operations. For simplification, an example is provided that has a source database at a first node and only one target database at a second node.

In the process, the transaction transmitter at the first node collects a block of transaction steps or transaction operations posted to the source database at the first node. Then, the transaction transmitter at the first node sends the block of transaction steps or transaction operations to the second node for posting to the target database therein. This process is repeated for additional blocks of transaction steps or transaction operations posted to the source database.

Unlike the Shadowbase scheme, in this embodiment of the present invention, commit operations are held up (inhibited) at either the source or the target database until it can be ensured that the source database and the target database can both be updated with the transaction data. That is, the transactions are replicated in a synchronous replication mode.

The block of transaction steps or transaction operations may be collected from a queue of transaction steps or transaction operations posted to a source database at the first node. In one preferred embodiment, the queue is an audit trail at the source database.

The synchronous replication mode preferably uses the RTC token scheme described above. However, the synchronous replication mode may alternatively use a conventional two-phase commit process. If the RTC token scheme is used, the following steps occur:

1. Pause each transaction being executed in the database at the first (originating) node prior to a commit operation for the transaction.

2. Assign a ready to commit token to the transaction.

3. Send the ready to commit token to the second node.

4. Determine at the second node whether the target database is prepared for a commit operation for the transaction corresponding to the ready to commit token, and, if so, send back the ready to commit token to the first node.

5. Execute a commit operation at the database of the first node only upon receipt from the second node of the ready to commit token originally sent from the first node. If there are a plurality of other nodes, then this step may require receipt from either a preselected number of nodes, certain designated nodes, or all of the nodes. As described in the detailed examples above, the commit operation may occur at the source database first and then at the target database. Alternatively, the commit operation may occur at the target database first and then at the source database. That is, if it is determined at the second node that the target database is prepared for a commit operation for the transaction corresponding to the ready to commit token, then the transaction may be committed at the target database before it is committed at the source database.

In another alternative scheme of this preferred embodiment, the database replication system switches from a synchronous replication mode (which is the normal mode) to an asynchronous replication mode when synchronous replication is not properly functioning. Synchronous replication is then restored when it is detected that synchronous replication can properly function again. Schemes for determining when synchronous replication is not properly functioning and when it should be restored are discussed in detail below.

O. "Dual Writes" Using Blocks of Transaction Steps or Operations with Synchronous Replication Disk mirroring is a disk storage process for generating a mirrored image of data on two or more disks. One disk is referred to as the "primary volume" and one or more other disks are referred to as "secondary volumes," "secondary disks," or "duplicates." The disks may be in the same system or in different systems, and the secondary disk may be local or remote from the primary volume. For simplicity, the remaining discussion will refer to the primary volume as a local database, and will refer to the secondary disk as a remote database.

One disk mirroring approach is a dual write server-centric approach wherein both disks (here, both databases) connect to the same processor which issues multiple disk write commands, one to each database. The software application that controls the mirroring operation is located in the processor which controls the write operations to both databases. The processor may be local to the local database, local to the remote database, or it may be remote from both databases. The processor may control all of the I/O for all of the application programs, or there may be many processors each receiving the I/O from some subset of the application programs. Also, there is a physical I/O between the application and the remote database.

In the dual write approach, a write operation for a transaction may occur in parallel if supported by the software (writes to the local database and the remote database may occur simultaneously), or serially (write to the local database first, and then write to the remote database, or vice versa). In either instance, the application considers I/O completion to occur only after both local and remote databases have completed their writes.

In the dual write approach, transaction steps or operations are mirrored one step or operation at a time. This approach adds a significant amount of time to the mirroring process since the software must wait for I/O completion for each transaction step or operation. Also, in the dual write approach, as well as mirroring in general, the two databases are always in a known state because a commit is required, often implemented via a two-phase commit, on both databases to complete the write process for a transaction (e.g., to free database locks.)

One preferred embodiment of the present invention queues and blocks transaction steps or operations in the same manner as described above in section L. The application then sends the blocks to the remote database as blocks. A synchronous replication process is used in conjunction with the mirroring.

More specifically, dual writes are performed in a database replication system that includes a local application which receives transactions, a local database associated with the local application process, and a remote database. Each transaction is defined by one or more transaction steps or transaction operations. The following steps occur in the broadest embodiment of the process:

1. A plurality of transaction steps or transaction operations are queued at the local application.

2. A block of queued transaction steps or transaction operations are sent to the remote database for posting thereto.

3. Steps 1 and 2 are repeated for additional blocks of transaction steps or transaction operations collected at the local application.

4. A commit operation is inhibited at either the local database or the remote database until it can be ensured that the source database and the target database can both be successfully updated with the transaction data. In this manner, the transactions are replicated using a synchronous replication mode.

The synchronous replication mode preferably uses the RTC token scheme described above. However, the synchronous replication mode may alternatively use a conventional two-phase commit process. If the RTC token scheme is used, the following steps occur:

1. Pause each transaction being executed in the remote database prior to a commit operation for the transaction.

2. Assign a ready to commit token to the transaction.

3. Send the ready to commit token to the remote database.

4. Determine at the remote database whether the remote database is prepared for a commit operation for the transaction corresponding to the ready to commit token, and, if so, send back the ready to commit token to the local application.

5. Execute a commit operation at the local database only upon receipt from the remote database of the ready to commit token originally sent by the local application. As described in the detailed examples above, the commit operation may occur at the local database first and then at the remote database. Alternatively, the commit operation may occur at the remote database first and then at the local database. That is, if it is determined at the remote database that it is prepared for a commit operation for the transaction corresponding to the ready to commit token, then the transaction may be committed at the remote database before it is committed at the local database.

P. Switching Between Synchronous and Asynchronous Replication Modes

Data replication systems are normally set to operate in either a synchronous or asynchronous replication mode. Synchronous systems are prone to failure due to a disruption in communication between nodes. Accordingly, a synchronous system may be programmed to automatically revert to an asynchronous system if such a failure is detected. For example, the VERITAS Volume Replicator (VVR) 3.2 data replication tool, available from Veritas Software Corporation, Mountain View, Calif., provides unidirectional replication of individual transaction steps or operations from the node on which an application is running (the Primary), to a remote node (the Secondary). VVR replicates in asynchronous and synchronous modes. Typically, the user selects one of the two modes. However, the synchronous replication mode can be configured in a "soft synchronous" mode which enables the user to specify what action is taken when the Secondary is unreachable. Soft synchronous converts to asynchronous during a temporary outage. If configured for soft synchronous mode, after the outage passes and the Secondary catches up with Primary (assuming that there is a surge in the write rate which causes a queue to build up at the Primary), replication reverts to synchronous. In a system that has this switching capability, the process for determining if a synchronous mode is properly functioning and for determining when to switch back from an asynchronous mode to a synchronous mode can be very complex. Additionally, when VVR is in synchronous mode, the source application is held up at every I/O operation until the I/O operation is applied into the target database, which can dramatically affect source application response rates.

One preferred embodiment of the present invention provides a queue inspection scheme for determining if a synchronous mode is properly functioning. This scheme is illustrated with an example having an originating node with a source database and another node having a target database. Each node has a replication engine and a queue of transactions that were posted to the database at the respective node. The replication engine at each node synchronizes the database at the originating node to the target database at the other node by sending the transactions in the queue to the target database. If the queue at the originating node is not draining, or is draining "too slowly" (i.e., replication latency is above a threshold) then it is presumed that synchronization between the source database at the originating node and the target database at the other node cannot be ensured. The system then reverts to an asynchronous replication mode. In one preferred scheme, the queue of transactions are developed from audit trail entries at the respective node.

Another preferred embodiment of the present invention presumes that synchronous replication cannot be ensured if the replication engine at the originating node is not properly functioning, e.g., if RTC tokens cannot flow between the systems.

Yet another preferred embodiment of the present invention determines when to switch back from an asynchronous mode to a synchronous mode. More specifically, a process is provided to determine when to restore a synchronous replication mode in a unidirectional or bidirectional replication system which replicates data associated with a plurality of transactions. The system includes a plurality of nodes connected via communication media in a topology. Each node includes a database. The system normally operates in a synchronous replication mode, but switches to an asynchronous replication mode when synchronization between a database at an originating node and a database at one or more of the other nodes cannot be ensured. Switching from a synchronous replication mode to an asynchronous replication mode need only occur on those connections where synchronization between a database at an originating node and a database at one or more of the other nodes cannot be ensured. If synchronization between a database at an originating node and a database at one or more of the other nodes can be ensured, the system can remain in synchronous replication mode with that set of node(s).

The following steps occur in the broadest embodiment of the process:

1. Detect replication latency.

2. Restore the synchronous replication mode when synchronization between a database at an originating node and a database at one or more of the other nodes can be ensured again (e.g., the replication queues are draining at an acceptable rate and RTC tokens can flow in both directions between the two systems), and replication latency becomes less than a predetermined time value.

During the synchronous replication mode, the RTC token scheme described above may be used, or a conventional two-phase commit may be used. If the RTC token scheme is used, then token latency may be used to decide when to restore synchronous replication. Token latency is the time it takes for a newly generated RTC token to travel from the end of a transaction queue at the originating node to the beginning of a replay queue at one of the other nodes. The synchronous replication mode may be restored when it is detected that synchronous replication can be ensured again and token latency becomes less than a predetermined time value.

Another preferred embodiment of the present invention addresses collisions when all or some of the nodes of a bidirectional replication system temporarily switch from synchronous replication to asynchronous replication and subsequently switch back. When the system is switched to the asynchronous mode, collisions may occur among queued transactions. To address this issue, the following steps are performed upon detection that the synchronous replication mode may be restored:

1. Send the queued transactions that do not cause any collision to the other nodes in their order of occurrence. For example, transactions that caused collisions can be identified by comparing a unique record indicia (such as a unique primary key) across the nodes; those that were updated on multiple nodes during the asynchronous period have collided.

2. Resolve any collisions in the remaining queued transactions and send the resolved transactions to the respective nodes. For example, the following techniques can be used:

a) Pick a winner based on some indicia of the change, such as most or least recent timestamp or sequence number, or pre-select a winner based on node information, such as the node location, node size, or node resources.

b) As described above, use "relative" change information to determine the "final" value for the data that collided, and assign the final value to the data in both nodes. For example, if a part quantity initially starts at 100, and one node changes the part quantity from 100 to 30 (a net reduction of 70), while another changes the part quantity from 100 to 90 (a net reduction of 10), assigning a final value of 20 (100−70−10=100−10−70=20) to the part quantity on both nodes resolves the collision.

3. After completing steps 2 and 3, switch back from the asynchronous mode to the synchronous mode.

In an alternative embodiment, when the system is switched to the asynchronous mode, collisions can be avoided by switching all inputs to one of the nodes. Additionally, in the case where there are more than two nodes, and all nodes are synchronously replicating, if replication to one or more of the nodes is converted to asynchronous, collisions can be avoided by switching all inputs from the asynchronous nodes to one or more of the synchronous nodes.

Q. Routing of Inputs after Switching from a Synchronous to an Asynchronous Replication Mode Another preferred embodiment of the present invention provides a process for routing transaction inputs in a bidirectional replication system which replicates data associated with a plurality of transactions. The system includes a plurality of nodes connected via communication media in a topology. Each node includes a database. The system normally operates in a synchronous replication mode, but switches to an asynchronous replication mode when synchronization between a database at an originating node and a database at one or more of the other nodes cannot be ensured. The following steps occur in the broadest embodiment of the process:

1. Select a winning node upon switching to an asynchronous replication mode. This node can be selected based on many criteria, including processing or database capacity, communication bandwidth capacity, location, etc.

2. Abort any transactions that were in progress on the non-winning node(s), as well as those in progress on the winning node that did not originate on the winning node.

3. Route all transaction inputs at the other nodes to the winning node during the time period of asynchronous replication, including those that were aborted in the step above.

Since the inputs are now directed to a specific winning node, advantages to this embodiment include avoiding data collisions between the nodes. Hence, the recovery steps to restore synchronous replication between the nodes (once synchronous replication can be restored) are simpler and can be achieved faster as no data collisions need to be checked for or resolved.

In another embodiment of the present invention, upon detection that synchronization between the database at the originating node and the database at one or more of the other nodes cannot be ensured, routing all subsequent transactions at the originating node to one of the other nodes.

In an alternative embodiment of this scheme, when more than two nodes are involved, only those nodes that cannot ensure synchronous replication switch to asynchronous replication. The inputs assigned to these asynchronous nodes are reassigned to other nodes that are still performing synchronous replication. In a specific example with three nodes (A, B, and C), all interconnected, receiving inputs, and performing synchronous replication, if node B cannot ensure synchronous replication with nodes A and C, node B's inputs are reassigned to nodes A and C, and replication from A to B and node C to B becomes asynchronous. Replication between nodes A and C remains synchronous. Later, once replication to node B can be restored to synchronous, nodes A and C will resume synchronous replication to it, and inputs could be reassigned to it.

In another alternative embodiment of this scheme, upon detection that synchronization between the database at the originating node and the database at one or more of the other nodes cannot be ensured, one can either leave the transaction node assignments the same, or re-partitioning them to more fully utilize the processing capacity of each and switch to asynchronous replication. The major disadvantage of this approach is that data collisions can occur. However, these collisions may not be a problem for this application, and/or may not be hard or troublesome to resolve once synchronous replication can be restored. The major advantage to this approach is that the system retains full processing capacity/application scaling as all nodes are still receiving and processing inputs, and system availability remains high.

R. Routing of Inputs after Switching from an Asynchronous to a Synchronous Replication Mode Another preferred embodiment of the present invention provides a process for routing transaction inputs in a bidirectional replication system which replicates data associated with a plurality of transactions. The system includes a plurality of nodes connected via communication media in a topology. Each node includes a database. The system normally operates in a synchronous replication mode, but switches to an asynchronous replication mode when synchronization between a database at an originating node and a database at one or more of the other nodes cannot be ensured. Upon returning to a synchronous replication mode, the following steps occur in the broadest embodiment of the process:

1. If transaction initiations had been disallowed on the node(s), re-allow transaction initiations.

2. Partition the inputs across the node(s) based on many criteria, including processing or database capacity, communication bandwidth capacity, location, etc.

If the inputs are directed to a single node, data collisions are avoided. If the inputs are directed to more than one node, data collisions are still avoided because of the definition of synchronous replication. An additional benefit to re-partitioning the inputs is that the aggregate processing capacity of the system increases, i.e., the application can scale across the additional nodes. It also increases the availability of the entire system by increasing the number of available nodes with a complete copy of the database on them.

In an alternative embodiment of this scheme, when more than two nodes are involved, only those nodes that can ensure synchronous replication switch to synchronous replication and can start receiving inputs. Other nodes that cannot ensure synchronous replication remain using asynchronous replication. This has the advantage of avoiding data collisions.

S. Inhibit a "First I/O Operation" (E.G., "Begin") until Databases are Synchronized After system startup, and at the initiation of a transaction, the first I/O operation is typically a BEGIN step.

By managing the initiating of transactions at system startup, one can make sure that all of the other nodes (or some of the other nodes) are ready for replication processing, i.e., they do not have queues of unreplicated transactions waiting to be sent to the other nodes.

While the transaction is held up, the system can resolve any data in the transaction queues (as this may be present if the last state was using asynchronous replication and collisions may need to be resolved as described in other sections of the present specification, and get the databases at each node to match one another). If this step cannot be completed for a node, that node can be marked as "unavailable", with replication traffic being set to asynchronous to that node.

After resolving collisions in the multiple copies of the database, and draining the replication queues, the system can determine if synchronous replication is functioning properly to each node. If it is functioning properly, and synchronous replication can be ensured, all nodes allow the transactions to proceed, and the nodes use synchronous replication. If it is not functioning properly, the nodes determine which connections/nodes are not functioning properly, and use asynchronous replication to those nodes, and use synchronous replication to the remaining nodes.

Another preferred embodiment of the present invention replicates data associated with a plurality of transactions in a replication system including a plurality of nodes connected via communication media in a topology. Each node includes a database. The following steps occur in the broadest embodiment of the process:

1. Replicate the data from an originating node to one or more other nodes. Each transaction is one or more transaction steps or transaction operations.

2. Pause each transaction that is requested to be executed in the database at an originating node prior to a first I/O operation, such as a BEGIN transaction step, for the transaction upon detection that synchronization between the database at the originating node and the database at one or more of the other nodes cannot be ensured. The first I/O operation may be a begin operation.

Any suitable technique may be used to determine if synchronization between the database at the originating node and the database at one or more of the other nodes cannot be ensured. Some examples include:

1. The queue at any of the nodes is not draining, or is draining slower than a predetermined time period.

2. The replication engine is not properly functioning.

3. The databases become inaccessible to the replication engine for an extended period.

4. The nodes cannot communicate or cannot exchange RTC tokens.

Either synchronous replication or asynchronous replication may be used with this scheme. However, synchronous replication is preferred.

More specifically, the following sequence can be used for restarting the system after an outage of one or more of the nodes when the system wants to reattain synchronous replication between the nodes:

a) ABORT all transactions on all the nodes that had not reached RTC stage yet.

b) For transactions that were in the middle of an RTC sequence, if the RTC had not made it all the way back to the source application (and the target had NOT committed it), ABORT the transaction on the source.

c) For transactions that were in the middle of an RTC sequence, if the RTC came back to the source and the source committed, AND a source then target commit sequence occurs, then a "deferred transaction" case exists. Once the system starts back up, new transactions must be held up until all deferred transactions are replayed on all of the target nodes and committed.

d) For transactions that were in the middle of an RTC sequence, if the RTC came back to the source and the target had already committed (a target then source commit sequence), then a "deferred transaction" case exists. Once the system starts back up, new transactions must be held up until all deferred transactions are replayed on all the source nodes and committed.

A similar case exists when re adding a node that is currently receiving asynchronous replication feed into the system of nodes (which could be just one so far) that are currently using synchronous replication. In this case, it must be determined if synchronous replication to this node can be ensured (see explanations above). Then, one needs to resolve any data collisions (note that if the node receiving the async replication was not processing inputs, then none could have occurred). A method to reintegrate this async node is as follows:

a) Inhibit the BEGINs on the async node (alternatively, re-route any inputs from this node to the sync node that is sending transactions async to this async node).

b) Resolve any collisions between the async node and the sync node (drain the transaction queue, etc).

c) When sync replication can be ensured, convert to sync replication to the async node.

d) Enable BEGINs on the new sync node (the old async one).

e) Repartition/split the inputs (optionally) to include the new node.

During this sequence, the sync node kept receiving and processing inputs.

Depending on the implementation, in step a, one can also inhibit the first 1/0 operation (thereby suspending the transaction initiations) on the sync node, and then re allow them to proceed in step d.

T. Bring New Node Online

Another preferred embodiment of the present invention provides a method for adding another node, or replacing a failed node, while the entire system remains active (able to process inputs). An advantage of this method is that the existing nodes in the system remain on-line processing inputs as the new node is brought on-line, synchronized with the database, and eventually starts to receive inputs directly, thereby increasing the overall processing bandwidth and availability/disaster tolerance of the entire system. While the new node is brought on-line, data collisions are avoided in the new node's database as it is built.

The node to be added is assumed to need an initial database load (to populate all of the database files/tables with an initial copy of the data).

The steps to re-add this node into the system are as follows:

1. Pick a node in the existing system to extract the load data from, called the source node (the source node will also provide the asynchronous replication feed to the new node prior to the cut-over to synchronous replication for the new node).

2. Do not allow transaction initiation on the target (disallow BEGINs). This is optional if the new node is not receiving inputs.

3. Perform an initial load of the source database into the target node's database. Some techniques include:
   i. BACKUP/RESTORE
   ii. On-line COPY or DUPLICATION (assuming the source and target database support this activity).
   iii. On-line loading, as described in U.S. application Ser. No. 09/930,641 filed Aug. 15, 2001, entitled "Synchronization of Plural Databases in a Database Replication System", incorporated by reference herein.

4. Next, turn on unidirectional asynchronous replication from the source node to the target node. If the load step did not capture and data changes being made to the source database while the load was being performed, send that DB change transactional data first (BACKUP/RESTORE and On-line COPY/DUPLICATION typically require this resync step, the On line loading approach does not). In contrast, U.S. Pat. No. 5,884,328 (Mosher) describes a technique for BACKUP/RESTORE style loading, followed by applying the suspended DB delta information to "catch up".

5. Determine when it is a "good time" to restart synchronous replication mode between the source and target nodes (as defined in other sections of this document), and convert the source's replication mode to the target node to synchronous (from asynchronous).

6. Allow transaction initiation on the target (e.g., allow BEGINs) if it was disabled above.

7. (Optionally) Split the application feed to include the target system.

U. Virtual Token/Physical Token Processing

"Virtual tokens", sometimes referred to as "logical tokens" or "logical markers", can be contrasted with "physical tokens", sometimes referred to as "physical markers", in several significant ways. All of the previously described "physical RTC token" schemes that describe an RTC token/marker may be modified to use virtual RTC tokens/markers.

A physical marker represents a data item, object, event, signal, call-back, interrupt, or other notification that flows through the system at a specific point in the processing stream, whereas a virtual marker merely represents a point in the processing stream where the marker logically exists. For a virtual marker, nothing actually flows or takes up space in the processing stream. Rather, it is the location in the processing stream where this token would exist that is important.

A significant feature of either marker type is that they both can be ignored, and the replication process can still proceed successfully, as long as the target database replays the transaction steps or operations in the order they occurred in the source. Independent I/O's, i.e., those that do not affect the same row data, can be replayed in any order provided the transaction boundary is preserved. As long as no errors or timeouts (e.g., on another transaction's locks) occur when the target replays the replication events, the source can apply the commit and continue. If any such error or timeout were to occur, the target would alert the source of the condition and the source could abort (or backout) the transaction.

V. Token "Piggybacking" and Delivery

The path that tokens take to arrive in the target can be via many routes. The preferred embodiment of the present invention sends them via the audit trail, interspersed at the appropriate point with transaction steps or operations. These tokens can be "piggybacked" onto the last transaction step or operation for their transaction, as well as onto a transaction step or operation for any other transaction. Piggybacking is one preferred scheme in extensive multi-threaded transaction processing environments.

Another route can be via another "dedicated" path between the source and target replication components. In this technique, the token contains sufficient information to identify where in the audit trail or processing stream path it should be logically or physically inserted. The token is then sent, to the target replication component such as in a block with other tokens.

W. Data Input Routing after Failure

Inputs, or transactional steps or operations, will typically be sent from an input device to a single node for execution. This node may be arbitrarily assigned, or assigned based on some node characteristics, such as location or processing capacity. Typically, if the connection between the input device and the node ceases to operate satisfactorily, the input device will abort the transaction and retry the sequence when the connection is restored, or will abort the transaction and retry the sequence to a new node.

In an alternative embodiment of the present invention, when replication is being used to keep two or more nodes synchronized, upon failure of the connection between the input device and a original node in this system, the input device could route the remaining transaction steps or operations to an alternate node. When this alternate node receives the initial transaction steps or operations via the replication channel from the original node, it could append these additional steps or operations to complete the original transaction. As long as these additional steps or operations are replicated back to the original node, the original node will also be able to complete the original transaction.

In both cases, after a failure of a communication channel between the input device and a node, by re-routing the remaining input device's transaction steps or operations to a new node in the system, the original transaction can be completed without aborting and retransmitting the entire transaction again.

X. Synchronous Replication Availability and Efficiency

It can be shown that splitting a system increases the availability of a processing system. See, U.S. Patent Application Publication No. 2003/0172074 (Highleyman et al.).

If a system is split into multiple independent nodes, it is important to have two or more copies of the database distributed across the network in order that application data is available to surviving nodes in the event of a node failure.

These database copies should all be kept in synchronism so that all applications running on all nodes will have the same view of the application data. This synchronism can be easily achieved via asynchronous data replication—there are many data replication products available today that provide this capability without having to modify the applications, such as Shadowbase. However, if all nodes are actively participating in the processing of transactions, data collisions, or the undesirable condition where the same data item is updated at more than one database copy at the same time, may occur at an uncomfortable rate due to replication latency. These data collisions, unless detected and resolved, will result in database contamination.

Data collisions can be avoided by synchronously updating all database copies so that all copies of all data items are always guaranteed to be the same. This can be accomplished with synchronous data replication.

X.1 Replicating Systems

The replication of systems is an important and popular technique to ensure that critical computing systems will survive system failures caused by anything from component failures to man-made or natural disasters.

Figure 9:
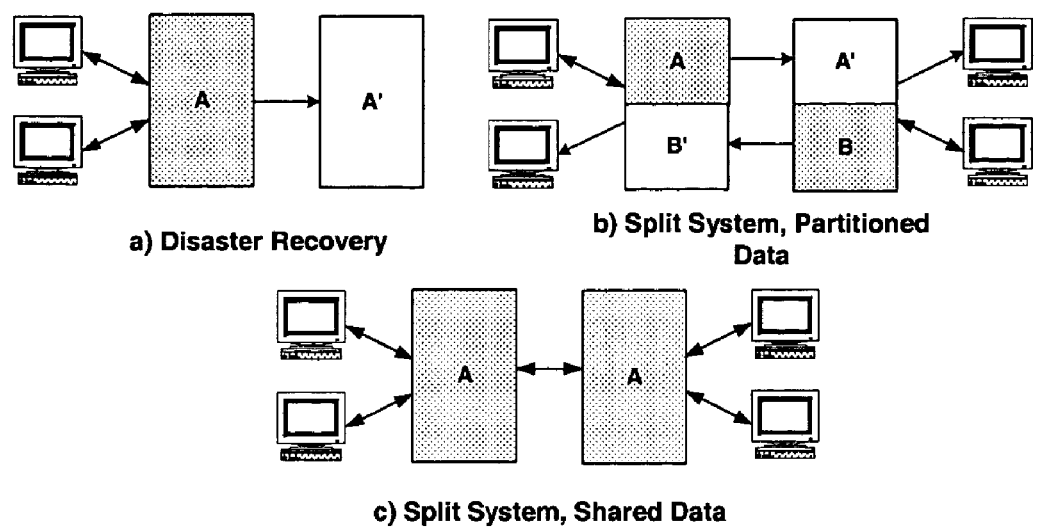
FIG. 9 illustrates various system splitting architectures.

Under a typical system replication scenario, one system is the primary and handles the entire transaction load. As shown in FIG. 9, part a, updates made by the primary system to its database are replicated to the backup system. The backup system is passive except for perhaps supporting read-only operations such as query and reporting.

It can be shown that fully replicating a system, in addition to providing protection from disasters, has the effect of improving the availability (i.e., doubling the number of its 9s, e.g., for a system with 0.99 availability the availability becomes 0.9999 when the system is fully replicated), thus dramatically improving the overall system's availability. See, Highleyman, W. H., et al.; "Availability (Part 1)," ITUG Connection, November/December 2002.

X.2 Splitting Systems

Alternatively, significant availability advantages can be achieved by simply splitting a single system into k nodes. Doing so could increase system reliability (i.e., increase its mean time before failure, MTBF) by more than a factor of k. Highleyman, W. H., et al.; "Availability (Part 2)," ITUG Connection; January/February, 2003

However, when a system is split (for example, splitting a 16-processor system into four 4-processor nodes), all nodes must be actively sharing the load. This implies that all nodes are updating the database.

Often, the database can be partitioned so that only one system can update a given partition; and those updates can be replicated to the other systems for read-access only (FIG. 9, part b). In this case, the most serious concern is "replication latency," or the time that it takes for an update to propagate from the source node to the target node. Updates in the replication pipeline may be lost in the event of a system failure.

However, in the more general case, any system in the network must be able to update any data item (FIG. 9, part c). Those updates then must be replicated to the other databases in the network. These are called "active/active" replication applications. In addition to the problems imposed by replication latency, as described above, active/active applications present additional significant problems. One of the most severe problems is data collisions. To the extent that there is replication latency, there is a chance that two systems may update the same data item in different copies of the database simultaneously. These conflicting updates then will be replicated across the network and result in a corrupted database (i.e., the value of the data item will be different in different instances of the database).

For instance, an application at node A might change the value of a particular data item from 10 to 15. At nearly the same time, an application at node B might change that same data item from 10 to 20. Node A will then replicate its value of 15 to node B, which will set the data item value to 15. Likewise, node B will replicate its value of 20 to node A, which will set the value of the data item at its node to 20. Now the data item not only has different values at the two nodes, but both values are wrong.

These simultaneous conflicting updates are called "data collisions." Data collisions must be detected and resolved, often manually.

X.3 Data Collisions

The probability that data collisions will occur is surprisingly high. An extension of Jim Gray's work (Gray, J.; et al.; "The Dangers of Replication and a Solution," ACM SIGMOD Record (Proceedings of the 1996 ACM SIGMOD International Conference on Management of Data), Volume 25, Issue 2; June, 1996), shows that the data collision rate in such a network is given by $$\text{Data Collision Rate} = \left(\frac{d-1}{d}\right)\frac{(kra)^2}{D}(L+t/a)$$

where
- r is the transaction rate generated by one node in the network,
- a is the number of replicable actions in a transaction (updates, inserts, deletes, and in some systems read/locks),
- t is the average transaction time,
- k is the number of nodes in the network,
- L is the replication latency time,
- d is the number of database copies in the network,
- D is the size of the database (in terms of data objects—i.e., the lockable entities).

Consider a system split into four nodes with a requirement to maintain an up-to-date database at each node (k=d=4). Assume that each node generates a leisurely ten transactions per second (r=10) and that an average transaction involves four updates (α=4) and requires 200 milliseconds to complete (t=2). Furthermore, assume that a database requires 10 gigabytes and that an average row (the lockable entity) takes 1,000 bytes. Thus, the database contains 10 million lockable objects (D=10,000,000). Finally, the replication latency is 300 milliseconds (L=0.3).

Using the above relation, the system will create over 2.4 collisions per hour. This can be a major headache. If the nodal transaction rate increases to 100 transactions per second, the collision rate jumps to over 240 collisions per hour. This will certainly keep a team of people busy. If the system then grows to eight nodes, the collision rate will explode to over 1,100 collisions per hour. This is untenable.

Data collisions first must be detected and then must be corrected either manually or by automatic conflict resolution via business rules. Collision detection methods not only add overhead to the replication engine, but they also are only the start to collision resolution. The correction and resynchronization of the database is often a lengthy and manual operation since automated resolution rules are often not practical.

X.4 Synchronous Replication

This section presents methods for avoiding data collisions in active/active applications rather than having to correct them. See, U.S. Patent Application Publication No. 2002/0133507 (Holenstein et al.). By implementing collision avoidance, there is no need for a collision detection mechanism; nor is there need for a resolution strategy that may involve complex business rules. (This is an oversimplification. As pointed out later, network failures and node failures require resynchronization of the databases in order to recover. However, this statement is valid for normal operations.)

The avoidance of collisions requires that all data items be updated synchronously. That is, when one copy of a data item is updated, no other copies of that data item can be changed by another update until all other copies have been similarly updated as well. This is called "synchronous replication."

Synchronous replication carries with it a performance penalty since the transaction in the originating node may be held up until all data items across the network have been updated. In this section, the performance impact of synchronous replication is explored.

Two techniques for synchronous replication are considered—dual writes and coordinated commits. To simplify the analysis, only two-node systems are considered. This analysis is extended later to systems comprising multiple nodes, and the conclusions are the same.

X.4.1 Dual Writes

In this context, the term "dual writes" is just another name for network transactions. Dual writes involve the application of updates within a single transaction to all replicates of the database. This is accomplished by using a two-phase commit protocol under the control of a distributed transaction manager. The transaction manager ensures that all data items at all sites are locked and are owned by the transaction before any updates are made to those data items, and it then ensures that either all updates are made (the transaction is committed) or that none of them are made (the transaction is aborted). In this way, it is guaranteed that the same data items in different databases will always have the same value and that the databases therefore will always be consistent.

Figure 10:
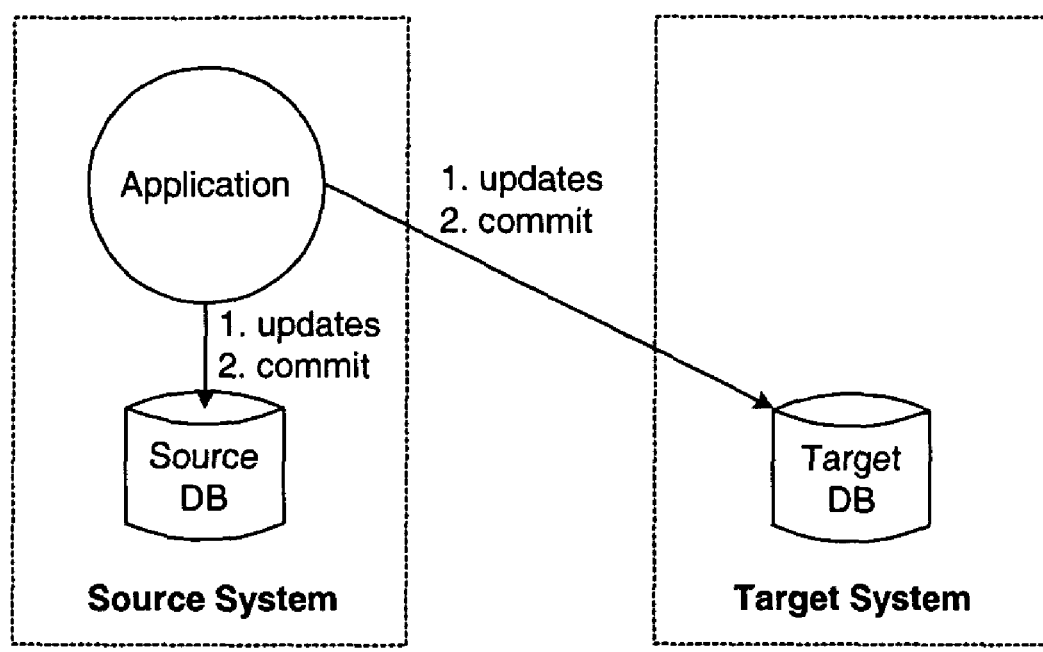
FIG. 10 illustrates the sequence of steps and the data flow paths for dual writes.

A simple view of synchronous replication using dual writes under a transaction manager is shown in FIG. 10. A transaction is started by the application, and updates are made to the source database and also to the target database across the network (1). The updates to the target database may be generated directly by the application, may be generated by an intercept library, or may be generated by database triggers that invoke, for instance, a stored procedure when an update is made. Each updated data item is locked, and the locks are held until the completion of the transaction. When all updates have been completed, the transaction will be committed. At this time, the transaction manager will apply all updates to the source and target databases (2). If the transaction manager is unsuccessful in doing this, then the transaction is aborted; and no updates are made.

There is a very small window of confusion (also referred to as the "uncertainty window") that may cause the outcome of a transaction to be uncertain under some failure conditions. This is a characteristic of the two-phase commit protocol commonly used by transaction managers. Typically, when the originating application is ready to commit, the transaction manager will ask each node involved in the transaction if it is ready to commit. If all nodes concur that they are holding all locks and have safe-stored all modifications (completion of phase 1), then the transaction monitor will command all nodes to commit (phase 2). Should the network fail after a remote node has responded favorably to the phase 1 "ready to commit?" query but before that remote node has received the phase 2 commit command, then the remote node does not know whether the transaction was committed or aborted. This situation must be resolved either manually or by business rules governing the system behavior in this very unlikely situation.

Note that transaction updates under a transaction manager may be done either serially or in parallel. If the updates are serial, then the application must wait not only for the local updates to be made, but it must also wait for the update of each remote data item over the network. If updates are done in parallel, then to a first approximation the application is delayed only by the communication channel propagation time. The read/write time at the target database is transparent to the application since it must spend this same amount of time updating the source database.

Most operating systems or databases today do not support dual writes directly. Therefore, to implement dual writes, it is usually necessary to actually modify the application, to bind in an intercept library, or to add triggers to the database to perform the writes for each data item to each database copy. Thus, implementing a dual write solution is invasive to the application in most cases.

X.4.2 Coordinated Commits

An alternative approach to dual writes is to begin independent transactions on each node and then to "coordinate the commits" of those transactions so that either they both commit or that neither commits. In this case, normal data replication techniques are used to propagate updates asynchronously to the target node. There they are applied directly to the target node's database as part of its transaction that was started on behalf of the source node. In this way, the propagation of updates over the network is transparent to the application.

Figure 11:
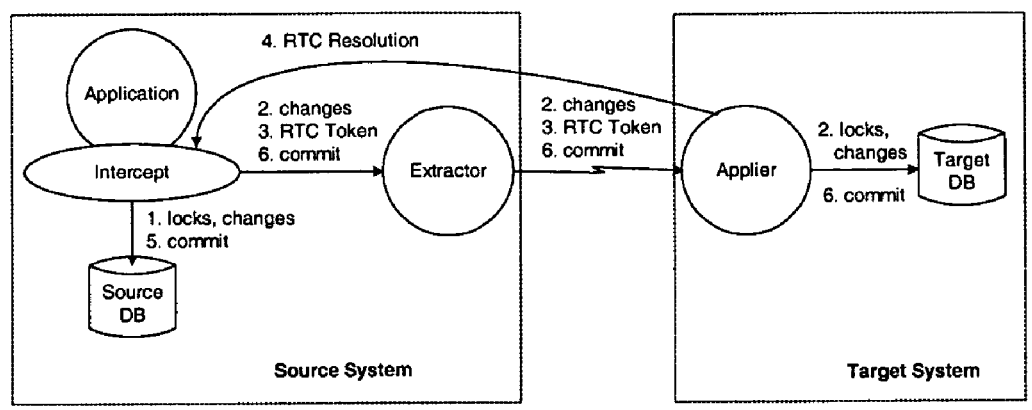
FIG. 11 illustrates the sequence of steps and the data flow paths for coordinated commits.

A simplified view of an implementation for coordinated commits is shown in FIG. 11. The application first will start a local transaction. As the application locks data items and makes updates to its source database (1), the changes to the database are captured. These updates are sent to the target node (2), where a transaction is started, locks are acquired, and the updates are made to the target database.

When the application attempts to commit the transaction, the commit is intercepted (perhaps by an intercept library linked into the application). Before the source node is allowed to commit the transaction, a Ready-To-Commit (RTC) Token is sent to the target node (3) through the replicator to assure that the token will arrive at the target node after the last update. The RTC Token queries whether all of the changes to the target database are ready to be applied. At this point, the target node will respond to the source node with an RTC Resolution message (4). The source node side of the data replicator will release the commit to the source database (5). When this has committed successfully, a commit message is sent to the target node (6), which then will commit the transaction.

Should the target node respond negatively to the RTC Token, then the transaction is aborted at the source node. There is the possibility that the source commit might succeed and that the subsequent target commit fails. Since the target node has guaranteed that it is holding locks on all of the data items to be updated when it returns the RTC Resolution, then this type of failure should occur only if the target node or the network fails after the target node has returned the RTC Resolution and before it receives the commit directive from the source node. This failure window is similar to the window of confusion described earlier for dual writes.

In this case, the normal data resynchronization capabilities of the replication engine will have to be invoked to resynchronize the databases. However, the databases will be out of sync anyway when the target node is returned to service. The lost transaction is just one of many that will be recovered through the resynchronization procedure. Resynchronization facilities are normally provided with data replication engines. However, this is often not the case if dual writes are being used—database resynchronization following a network or target node failure often requires a user-written resynchronization utility.

Note that coordinated commits are implemented with a standard asynchronous data replication engine that has been enhanced to coordinate the commits at the various nodes. Therefore, as with asynchronous replication, an application can be retrofitted to be distributed using coordinated commits without modifying the application. The use of coordinated commits, unlike dual writes, is non-invasive to the application.

In addition, data replication offers the option to enhance the efficiency of data communication channel utilization by buffering the many small messages involved and then sending them to the remote nodes as blocks of changes. When dual writes are used, each database change must generally be sent individually.

X.5 Application Latency

From a performance viewpoint, one is interested in the additional delay imposed upon a transaction due to having to wait for the completion of updates to the target node. This additional delay caused by synchronous replication is called "application latency."

Note that if data replication is asynchronous rather than synchronous, then the application will not be delayed by data replication. Instead, the target database will lag behind the source database by a time interval which is called "replication latency."

Also note that application latency will increase the response time for a transaction but will not in itself affect throughput. Throughput can be maintained simply by configuring more application processes to handle the transaction load. This solution, of course, assumes the use of well-behaved application models that allow the use of replicated application processes such as in HP's NonStop server classes.

The application latency for dual writes and for coordinated commits can be calculated so that they can be compared.

X.5.1 Dual Writes

To simplify the analysis of dual write application latency, assume that all remote database operations are done in parallel with the database operations at the source node. Further assume that all database operations are full updates that require a read/lock of the data item followed by a write rather than simple operations such as read/locks (that is, fetches), inserts, and/or replacements that require only one access of the database. It is quite straightforward to modify the following relationships to account for these factors. In fact, this is done later in this section and it is shown that the general conclusions reached are unchanged.

In order to update a data item across the network, a read/lock command first must be issued and the data item then received. Next, the updated data item must be returned to the target database and a completion status received. Thus, there are four network transmissions required to complete one update.

In addition, the transaction manager's two-phase commit protocol requires four network transmissions. A prepare-to-commit message is sent and is followed by a response (phase 1). Then the commit message is sent and is followed by its response (phase 2). Only upon receipt of the commit response is the transaction considered to be complete at the source node.

Let
$L_{dw}$ be the dual write application latency
$n_u$ be the average number of updates in a transaction,
$t_c$ be the communication channel propagation time, including communication driver and transmission times.

Then $$L_{dw} = 4n_u t_c + 4t_c \qquad (4\text{-}1)$$

In Equation (4-1), the first term is the communication time required to send the updates to the target node. The second term is the communication time required to commit the transaction.

The above has ignored the processing time required for generating the additional remote database operations and for processing their responses. These times generally are measured in microseconds, whereas channel propagation times typically are measured in milliseconds.

X.5 2 Coordinated Commits

Coordinated commit replication requires the use of a data replication facility to propagate the updates to the target node. Most of the time spent by this facility is invisible to the application providing that updates to the remote database are made as soon as they are received without waiting for the commit (the optimistic strategy).

However, once all updates have been made, the application then must wait for the RTC Token to be exchanged before it can carry out its transaction commit. Note that once the commit has completed at the source node, the subsequent commit at the target node is asynchronous relative to the application. The commit's success is guaranteed since the target node has acquired locks on the data items to be changed, and it will apply the changes upon receipt of a commit directive from the source node. Therefore, the source node does not have to wait for the target node's commit to complete, and the target node commit thus does not add to application latency (of course, one could commit at the target first).

The application latency for coordinated commits, $L_{cc}$, is estimated as follows. Let
$L_{cc}$ be the application latency for coordinated commits
$t_p$ be the processing delay through the replicator exclusive of the communication channel propagation time,
$t_c$ be the communication channel propagation time, as defined previously.

The RTC Token is sent through the replicator following the last transaction update to ensure that the token is received by the target node after the final update has been received. The time to propagate the RTC Token is therefore the replication latency of the replicator, $t_p$, plus the communication channel delay, $t_c$. The return of the RTC Resolution requires another communication channel delay. Thus, $$L_{cc} = t_p + 2t_c \qquad (4\text{-}2)$$

X.6 Synchronous Replication Efficiency

A comparative measure of synchronous replication efficiency may be defined as the ratio of dual write application latency to coordinated commit application latency:

$$e = \frac{L_{dw}}{L_{cc}}$$

where
- e is comparative synchronous replication efficiency,
- $L_{dw}$ is dual write application latency
- $L_{cc}$ is coordinated commit application latency Thus, for e>1, coordinated commits outperform dual writes. For e<1, dual writes perform better.

From Equations (4-1) and (4-2), $$e = \frac{4n_u t_c + 4t_c}{t_p + 2t_c} = \frac{2(n_u + 1)t_c}{\frac{t_p}{2} + t_c} \quad (4\text{-}3)$$

Equation (4-3) can be rewritten as $$e = \frac{2(n_u + 1)}{1 + t_p/2t_c} = \frac{2(n_u + 1)}{1 + 1/p} \quad (4\text{-}4)$$

where
- p is the round trip communication channel time expressed as a proportion of replication delay time:

$$p = 2t_c/t_p \quad (4\text{-}5)$$

FIG. 12 shows replication efficiency e plotted as a function of communication channel time p for various values of transaction sizes $n_u$. The regions of excellence for dual writes and for coordinated commits are shown.

The values of p and $n_u$ for e=1 define the excellence boundary between dual writes and coordinated commits. From Equation (4-4), this relation is $$2(n_u + 1) = 1 + 1/p$$

or $$p = 1/(2n_u + 1) \text{ for } e = 1 \quad (4\text{-}6)$$

Figure 13:
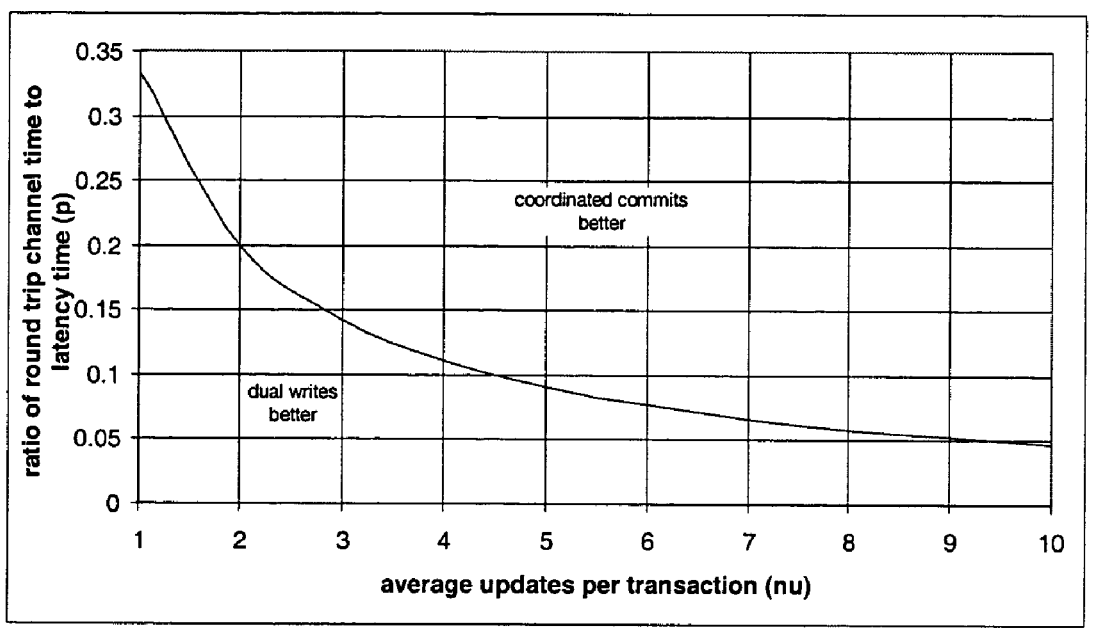
FIG. 13 illustrates the ratio of round-trip channel time to latency time plotted for various transaction sizes.

This relationship is shown in FIG. 13.

FIG. 12 and FIG. 13 are for the case of parallel read/writes. Remember that the parameter, p, shown on the horizontal axis of FIG. 12 and on the vertical axis of FIG. 13, is the ratio of the round trip channel propagation time to the replication latency time. As such, it is a measure of the channel propagation time in terms of latency time. As a ratio, p is dimensionless. For instance, if the round trip channel propagation time is 20 msec., and if the latency time is 50 msec., then p is 0.4. If the round trip channel propagation time is reduced to 10 msec., then p is reduced to 0.2. That is to say, round trip channel time is 20% of the replication latency time.

The efficiency expressions for serial read/writes do not lend themselves to such simple charting. However, the efficiency for serial read/writes will be even better for coordinated commits since dual writes will have the additional application latency of having to wait for the remote reads and writes to complete.

Likewise, these figures are for the case of no simple database operations (operations that may require only a single communication channel round trip such as read/locks, inserts, replacements). To the extent that some updates are simple operations such as these, dual write performance will be better than shown since network traffic is reduced. The efficiency curves may be modified easily to reflect this situation.

X.7 Scalability and Other Issues

There are other issues to consider when comparing synchronous replication algorithms, including scalability (as it relates to performance) as well as various other algorithm optimizations. A discussion of these issues follows, including the effects of multiple database copies, communication channel efficiency, and transaction profile.

X.7.1 Multiple Database Copies

If there are d database copies in the application network, then an application using dual writes must make d modifications for every database modification required by the transaction. However, under coordinated commits, the application must make only one database modification for each required by the transaction; the other (d−1) modifications are made by the replication engine and do not affect the application.

Therefore, if other processing is ignored, application latency (which adds to transaction response time) under dual writes will increase with the number of database copies, d, whereas the transaction response time for coordinated commits is relatively unaffected by the number of database copies. Thus, coordinated commits are more scalable than are dual writes.

X.7.2 Communication Channel Efficiency

With dual (or plural) writes, each modification must be sent to all database copies as the modifications are made at the source node. Therefore, this method will send many small messages over the network. The coordinated commit method, on the other hand, has the opportunity to batch multiple change events into a single communication block and thus send several change events within a single block.

For instance, if the application network is making 10 database modifications per second, then 20 messages per second must be sent over the network to each database copy by dual writes (assuming that all modifications require a read followed by a write). Coordinated commits may need to send only one or a few blocks, depending upon the replication latency desired.

If the system is making 1,000 modifications per second, then 2,000 messages per second must be sent to each database copy by dual writes. However, the number of messages sent by coordinated commits, even to achieve small replication latencies, can be one or two orders of magnitude less than this.

As system activity grows, network traffic due to dual writes will grow proportionately. However, network traffic generated by coordinated commits will grow much more slowly as more and more messages are accumulated into a single communication block before they must be sent. Therefore, coordinated commits are much more scalable with respect to communication network loading than are dual writes.

X.7.3 Transaction Profile

Another difference between dual writes and coordinated commits has to do with the transaction profile. In dual writes, the individual database accesses and updates required by a transaction are each delayed as they are sent over the communication channel to the target systems. At commit time, the application must wait for a distributed two-phase commit to complete.

In contrast, with coordinated commits, the source application transaction runs at full speed until commit time, and then pauses while the RTC is exchanged. At the end of this exchange, the application waits for a local (single node) commit to complete. This single node commit should be significantly faster than the distributed two phase commit required to ensure durability on the target systems.

Depending upon the application design, this can be quite advantageous, since the entire application latency is lumped into the commit call time. Furthermore, there may be no slowdown in those applications that support non-blocking (nowaited) commit calls since all of the coordinated commit application time will occur while the application is processing other work.

X.7.4 Read Locks

Coordinated commits and dual writes process read lock operations differently. At times, an application will read a record or row with lock, but not update it (for example, if an intelligent locking protocol is in use). With many implementations of dual writes, the target system record or row will be locked when the source record or row is locked. With coordinated commits, only the source data items are affected—read locks are not necessarily propagated. They only need to be propagated if the data item is subsequently updated. Therefore, not only will dual writes impose more overhead on the network and on the target system, but other transactions may be held up if they are trying to access the target data items that are locked. Thus, coordinated commits should support a higher level of concurrency than dual writes.

X.7.5 Other Algorithmic Optimizations

Of course, some optimizations to the dual write algorithm could be implemented. For example the individual I/O operations could be batched or aggregated and sent together. These optimizations effectively morph the dual write algorithm into a variant of the coordinated commit algorithm with some associated performance and network efficiency gains.

Consider an example wherein an individual, Jane, needs to pay a $150 utility bill from her checking account. Jane also has a savings account at the same bank and periodically transfers money between the accounts. Jane first checks the balance in her checking account balance and sees that it is $60, and thus is insufficient to cover the utility bill. Jane then checks the balance in her savings account and sees that it is $400. Jane then transfers $100 from her savings account to her checking account so that the new checking account balance is $160, an amount sufficient to pay the utility bill. The transaction steps or operations associated with this transaction that occur at the originating node are as follows:

1. BEGIN
2. READ ON CHECKING ACCOUNT (checking account will be locked as part of the read process)
3. READ ON SAVINGS ACCOUNT (savings account will be locked as part of the read process)
4. UPDATE SAVINGS ACCOUNT (new balance is $300)
5. UPDATE CHECKING ACCOUNT (new balance is $160)
6. COMMIT (both locks are released as part of the commit)

In a conventional dual write scheme, the originating node will transmit and replicate each of the transaction steps or operations and any corresponding locks, to the replicated nodes as they occur. Thus, the transaction activity at the replicated nodes will look similar to the activity at the originating node. In the present invention, the activity that occurs at the replicated nodes is different than the activity at the originating node since there is no transmission or corresponding locks at the replicated nodes unless an update occurs. The activity at a replicated node will appear as follows:

1. RECEIVE THE FOLLOWING TRANSACTION STEPS OR OPERATIONS AS A SINGLE BLOCK:
   A. BEGIN
   B. READ ON SAVINGS ACCOUNT
   C. READ ON CHECKING ACCOUNT
   D. UPDATE SAVINGS ACCOUNT
2. PERFORM TRANSACTION STEPS OR OPERATIONS 1A–1D. (The savings account and checking account may be locked either as the READ operation occurs, or only upon initiation of the UPDATE.)
3. RECEIVE THE "UPDATE CHECKING ACCOUNT" TRANSACTION STEP OR OPERATION.
4. PERFORM THE "UPDATE CHECKING ACCOUNT" TRANSACTION STEP OR OPERATION.
5. RECEIVE COMMIT
6. PERFORM COMMIT (both locks are released as part of the commit)

The process of the present invention reduces transmission activity since there is less total transmission activity associated with sending a block of transaction steps or operations compared to sending the transaction steps or operations individually. Furthermore, the time that the records in the replicated databases spend in a locked condition is reduced since no lock occurs unless there is an update, and only upon receipt of the update. These benefits are even further illustrated by an example wherein Jane is merely checking her account balances, but not performing any transactions. In this example, there would be no replicated steps or operations, and thus no transmissions at all to the replicated nodes and no locks applied at the replicated databases.

Additionally, since the account balances are already known on the originating node, there is no need to send the account balances as a result of the READ operations on the replicated nodes back to the originating nodes, thus further reducing the network transmission activity.

This type of optimization is only allowed if the originating node does not need to verify the accuracy, or otherwise utilize the content, of the data records on the replicated nodes before progressing with the transaction on the originating node.

X.8 Examples

X.8.1 Geographically Distributed Systems

As an example, consider two systems, one in New York and one in Los Angeles, with the following parameters:

| | | |
|---|---|---|
| $t_p$ | 50 msec. | replication engine processing time, or the time to propagate an update through the replication engine from the source database to the target database, excluding communication channel propagation time. |
| $t_c$ | 25 msec. | communication channel propagation time, or the amount of time required for a message to propagate from the source node to the target node or vice versa over the provided communication channel, including line driver and transmission time. |

These parameters result in a value for p (from Equation (4-5)) of 1.0. The resulting efficiency for a given transaction size is, from Equation (4-4), $$e = \frac{2(n_u + 1)}{1 + 1/1.0} = (n_u + 1)$$

Efficiency as a function of the number of updates for this example is then:

| $n_u$ | e |
|---|---|
| 1 | 2.0 |
| 2 | 3.0 |
| 3 | 4.0 |
| 4 | 5.0 |

As is seen, coordinated commits are more efficient for all transaction sizes in the above example. This is a direct result of the communication channel delays. The application latency due to synchronous replication via coordinated commits is, from Equation (4-2), 100 msec. The application latency under dual writes is this value multiplied by the efficiency factor, e, in the table above.

Generally, coordinated commits may be more efficient except when the communication times are very small. Note, however, that even at the speed of light, it takes a signal about 25 milliseconds to travel round trip between New York and Los Angeles. Data signals over land lines will take at least twice as long, or about 50 msec. for a New York-Los Angeles round trip. A London—Sydney round trip may take about 250 msec.

Consequently, a generalized statement is that dual writes are appropriate for campus environments with small transaction sizes. On the other hand, coordinated commits are appropriate for wide-area network environments or for large transactions. In addition, an application can be retrofitted to support coordinated commits without any recoding by installing an appropriate data replication facility. This facility usually brings with it auto-recovery of files that have become unsynchronized due to network or node failures, a capability which will probably have to be specially developed for dual writes.

In general, as can be seen from FIG. 12 and FIG. 13 and from Equation (4-4), the larger the average transaction or the longer the communication channel propagation time, the more efficient coordinated commits become.

X.8.2 Collocated Systems

If the systems are collocated and interconnected via very high speed channels, the communication channel delay approaches zero; and dual writes may perform better for normal transactions.

However, for long transactions, there will come a point at which coordinated commits will be more efficient. This will be the point at which the processing time for the dual reads and writes at the target node, coupled with whatever communication channel delay exists, exceeds the time to exchange the RTC Resolution. Examples of long transactions are batch streams, box-car'd transactions, and database reorganizations.

To get a feel for this, consider the example of the previous section, but where the communication channel delay, $t_c$, is 2 msec. instead of 25 msec. In this case, p is 0.08; and efficiency from Equation (4-4) is $$e = \frac{2(n_u + 1)}{1 + 12.5} = \frac{(n_u + 1)}{6.75}$$

Solving this for e=1, replication for transactions of six updates or more is shown to be faster for coordinated commits than it is dual writes. For a six-update transaction, the coordinated commit application latency is, from Equation (4-2), 54 msec.

X.9 Efficiency Model Extensions

X.9.1 Dual Write Single Round Trip Operations

As pointed out earlier, not all database operations require two communication channel round trips as has been assumed so far. For instance, read/locks, replaces, and inserts require only one round trip—send the operation and receive the completion status. The above analysis can be extended very simply to account for these operations. Instead of there being $4n_u$ communication channel round trips for a transaction, there are $4n_{u2}+2n_{u1}$ round trips, where $n_{u1}$ is the number of transaction operations that require one round trip, $n_{u2}$ is the number of transaction operations that require two round trips, and $n_u = n_{u1} + n_{u2}.$ Define $$n_u' = n_{u2} + n_{u1}/2 \qquad (4\text{-}7)$$

The previous equations now hold except that $n_u$ is replaced with $n_u'$. The charts of FIG. 12 and FIG. 13 still hold except for the substitution of $n_u'$ for $n_u$.

X.9.2 Dual Write Serial Updates

If database changes are made serially when using dual writes, then the application must wait for all of the changes to be made not only to its local database but also to the remote database. Define $t_o$ as the average database operation time for the particular mix of operations generated by a transaction. Then, in addition to the communication delays, the application will have to wait an additional time of $n_u t_o$ for the remote database operations to complete. The dual write application latency time, originally given by Equation (4-1), now becomes $$L_{dw} = (4n_u' + 4)t_c + n_u t_o \qquad (4\text{-}1a)$$

and the efficiency relationship given by Equation (4-3) becomes $$e = \frac{(4n_u' + 4)t_c + n_u t_o}{t_p + 2t_c} \qquad (4\text{-}3a)$$

This can be written as $$e = \frac{2(n_u' + 1) + \frac{n_u}{2}\frac{t_o}{t_c}}{1 + 1/p} \qquad (4\text{-}4a)$$

where p was defined earlier as, $$p = 2t_c/t_p$$

If remote database operation time, $t_o$, is very much less than the communication channel time, $t_c$, then Equation (4-4a) reduces to Equation (4-4). However, as the communication channel delay $t_c$ approaches zero, Equation (4-4a) approaches $$e \approx \frac{n_u t_o / t_c}{t_p / t_c} = n_u \frac{t_o}{t_p} \qquad (4-8)$$

So far as estimating a reasonable value for the average database operation time, $t_o$, the following points are noted. Today's high-speed disks (15,000 rpm) have an average random access time of about 7 milliseconds (2 msec. rotational latency, 5 msec. seek time). If the record or row is in disk cache, today's systems require about 0.1 msec. to find it. If buffered writes are used (the write data is checkpointed to another processor and is physically written to disk some time later in the background), then a disk write will take about the same time as a disk read from cache (0.1 msec.), assuming that read and write cache hits are about the same (actually, disk writes might take a little longer due to block splits and index maintenance, but this is ignored here). A well-tuned OLTP application should be achieving something in the order of 80% cache hits. If this is the case, then 80% of read/write accesses will require about 0.1 msec. for cache access; and 20% will require about 7 msec. for a physical disk access. This results in an average disk access time of about 1.5 msec.

If typical values for $t_o$ of 1.5 msec. and for $t_p$ of 50 msec. are assumed, Equation (4-4a) shows that serial operations make little difference in efficiency for large communication channel delays. As communication channel delays disappear, the efficiency factor e, rather than going to zero, reduces instead to the value given by Equation (4-8). But for typical values (and assuming four operations per transaction, or $n_u$=4), this asymptotic value is only 0.12. Thus, it can be concluded that, in normal cases, dual write serial updates do not significantly affect the performance comparison between dual writes and coordinated commits.

X.9.3 Plural Writes

The above analysis for serial dual write updates assumed that there were only two copies of the database in the application network. But if there are more copies, then the application must wait for each operation to be completed on each remote database in turn. This means that the plural serial write application latency time becomes $$L_{dW} = (4n_u' + 4)t_c + (d-1)n_u t_o \qquad (4\text{-}1b)$$

where d is the number of databases in the application network.

The relative efficiency is then $$e = \frac{2(n_u' + 1) + (d-1)\frac{n_u}{2}\frac{t_o}{t_c}}{1 + 1/p} \qquad (4\text{-}4b)$$

which approaches $$e \approx (d-1)n_u \frac{t_o}{t_p} \qquad (4\text{-}9)$$

as communication channel time $t_c$ approaches zero.

If updates are done in parallel, then the original analysis still holds.

X.10 Deadlocks

A potential problem with synchronous replication whether it is done via dual writes or coordinated commits, is the possibility of a deadlock. A deadlock occurs when two different applications must wait on locks held by the other. In non-distributed applications, this can occur if the applications are trying to lock two different data items but in different order. Application 1 locks data item A and tries to get the lock on data item B. In the meantime, Application 2 locks data item B and then attempts to lock data item A. Neither can proceed.

This is the standard type of deadlock and can be avoided by an intelligent locking protocol (ILP). Under an ILP, all locks are acquired in the same order. In effect, an application must lock a row or record which acts as a mutex (an object which guarantees mutual exclusion). For instance, the application must obtain the lock on an order header before it can lock any of the detail rows or records for that order. In this way, if an application finds a data item locked, all it must do is wait until the owning application has released its locks; and it then can continue on. If an ILP is not being used, then deadlocks can be resolved by one or both applications timing out, releasing their locks, and trying again later at a random time.

Things are not so simple in a distributed system. Although all applications may be following a common ILP, consider an Application 1, running on node X, which locks data item A on its node X. Before that lock is propagated to node Y, Application 2 on node Y locks that same date item A on its node Y. Each application then attempts to lock the same data item on the remote node but cannot. A deadlock has occurred even though both applications were following the same ILP.

This deadlock occurred because though both applications were following local ILPs for the nodes they were on, distributing the database and allowing lock access to all copies of all data items in any order on any node means that a global ILP needs to be used. However, there is a solution. One node of the many nodes in the application network must be designated the master node. Locks must first be acquired on the master node before attempting to acquire locks on other nodes. In this way, there is one and only one mutex for each lockable data set.

X.11 Failures and Recovery

X.11.1 Dul (Plural) Writes

If a node or network fails in a dual write environment, then the application will have to switch to single node operation. Upon restoration of the node or network, an on-line database comparison and update utility will have to be used to update the remote database (this sort of utility is not normally provided with systems; rather, the entire database must be copied unless a user-written utility is provided). As with asynchronous replication, if an isolated node continues in service, then data collisions may occur during the outage as well as during the recovery process. These collisions will have to be detected and resolved.

X.11.2 Coordinated Commits

X.11.2.1 Failover

When using coordinated commits, the recovery of user services following a node or network failure is almost identical to that for asynchronous replication. In the event of a node failure, users may be switched from the failed node to the surviving node. If necessary, full operation resumes with the load shedding of non-critical functions. There is one important difference.

With asynchronous replication, transactions in the replication pipeline from the failed node are lost. With synchronous replication, no data is lost. Rather, one or more transactions may be held in an uncertain state. That is, if a node owning an outstanding transaction should fail after its target nodes have acknowledged its prepare-to-commit command or its RTC token but before the target nodes have received the commit command, then the target nodes do not know whether the source commanded either a commit or an abort or whether the source failed before it could do either. In this case, the target transactions are hung but are not lost. What is done with these transactions is application dependent, but at least the data is not lost.

Should the failure be a network failure, then it may be decided to switch users to a node which is not isolated. An alternative decision may be to allow the isolated node to continue independently.

X. 11.2.2 Restoration

In any event, during the outage, transaction updates will queue at the active nodes and will be sent later to the downed or isolated node when it is returned to service. At this time, replication proceeds as asynchronous replication to bring the remote database into. synchronization. If isolated nodes continue in service so that transactions are being replicated in both directions, collisions will have to be detected and resolved once the systems are reconnected.

When the Change Queues have been drained to the point that the replication latency is deemed to be acceptable, users can be re-switched to their home nodes; and synchronous replication can be restarted. Synchronous replication messages will simply queue behind the remaining asynchronous messages until those asynchronous messages have been processed, at which time the application returns to purely synchronous replication.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Changes can be made to the embodiments described above without departing from the broad inventive concept thereof. The present invention is thus not limited to the particular embodiments disclosed, but is intended to cover modifications within the spirit and scope of the present invention.

The invention claimed is:

1. A method of replicating data associated with a plurality of transactions in a replication system including a plurality of nodes connected via communication media in a topology, each node including a database, at least some of the nodes being able to independently receive and post transactions, each transaction being one or more transaction steps or transaction operations, including a commit operation, the method comprising:
    (a) initiating and performing transaction steps or transaction operations of a transaction to be executed in a database at an originating node; and
    (b) replicating the transaction steps or transaction operations to at least one or more other nodes while the transaction steps or transaction operations are being performed in the database at the originating node by:
        (i) pausing the commit operation for each transaction being executed in the database at the originating node,
        (ii) assigning a ready to commit token to the transaction,
        (iii) sending the ready to commit token to the one or more other nodes,
        (iv) determining at the one or more other nodes whether the respective databases are prepared for a commit operation for the transaction corresponding to the ready to commit token, and, if so, sending back the ready to commit token to the originating node, and
        (v) executing a commit operation at the database of the originating node only upon receipt from at least one of the other nodes of the ready to commit tokens originally sent from the originating node,
    wherein one or more transaction steps or transaction operations have been performed for each transaction being paused,
    and wherein step (b) is performed asynchronously with respect to other transaction steps or transaction operations that are initiated in step (a).

2. The method of claim 1 wherein the commit operation in step (b)(v) is performed only upon receipt from each of the one or more other nodes of the ready to commit tokens originally sent from the originating node.

3. The method of claim 1 wherein the transaction steps or transaction operations in step (a) are multi-threaded.

4. The method of claim 1 wherein in step (b)(iii), the originating node sends the ready to commit token to the one or more other nodes.

5. The method of claim 1 wherein the commit operation in step (b)(v) is performed only upon receipt from a predetermined number of other nodes of the ready to commit tokens originally sent from the originating node.

6. The method of claim 1 wherein step (b) (iii) is performed by combining the ready to commit token with the last transaction step or operation being replicated prior to a commit operation.

7. The method of claim 1 wherein at least one of the nodes is indirectly connected to every other node in the system via at least one other node, and the replicated transaction steps or transaction operations and ready to commit tokens are sent to the indirectly connected nodes via the at least one other node.

8. The method of claim 1 wherein each node further includes a table that stores indicia of initiated transactions that are at one or more predesignated intermediate points in the transaction but are not yet committed, and a transaction transmitter which sends selected transaction steps or transaction operations posted to the database and table entries to one or more other nodes, the method further comprising:
    (c) entering into the table at the originating node, indicia of the initiated transactions that are at one or more predesignated intermediate points in the transaction but are not yet committed, and assigning a ready to sync token to the transaction at each of the predesignated intermediate points; and the replicating step (b) further includes:

(vi) the transaction transmitter at the originating node sending the ready to sync tokens in the table of the originating node to the one or more other nodes;

(vii) determining at each of the one or more receiving nodes whether the database at the receiving node is prepared to properly process the transaction up to the intermediate point associated with the respective ready to sync token, and, if so, the transaction transmitter in each of the other nodes sends back the ready to sync tokens to the respective originating nodes; and (viii) stopping the execution of a transaction in the system if the originating node fails to receive back a ready to sync token from at least one of the other nodes in the system for any of the predesignated intermediate points, wherein the transaction continues to execute as long as all ready to sync tokens properly return to the originating node.

9. The method of claim 8 further comprising:

(d) if the execution of a transaction is stopped, restarting the transaction at the beginning of the predesignated intermediate point associated with the ready to sync token that failed to properly return from a node.

10. The method of claim 9 wherein the predesignated intermediate points occur at every N transaction steps or operations.

11. The method of claim 1 wherein the transaction is paused prior to the commit operation.

12. A method of replicating data associated with a plurality of transactions in a data replication system including first and second nodes connected via communication media in a topology, each node including (i) a database, (ii) a replication engine which performs data replication functions, and (iii) an application which executes transactions and posts the transactions to the database, the application being independent of the replication engine, each transaction being one or more transaction steps or transaction operations, including a commit operation, the method comprising:

(a) an application at a first node initiating and performing transaction steps or transaction operations of a transaction to be executed in a database at the first node, the application pausing the commit operation for each transaction being executed in the database at the first node, wherein one or more transaction steps or transaction operations have been performed for each transaction being paused;

(b) a replication engine at the first node assigning a ready to commit token to the transaction in coordination with the application;

(c) the replication engine at the first node sending the ready to commit token to the second node;

(d) a replication engine at a second node determining whether a target database at the second node is prepared for a commit operation for the transaction corresponding to the ready to commit token, and, if so, sending back the ready to commit token to the first node; and (e) the application at the first node executing a commit operation at the database at the first node in coordination with the replication engine only upon receipt from the second node of the ready to commit token originally sent from the first node, wherein the replication engine operates asynchronously with respect to the application until step (b) occurs.

13. The method of claim 12 wherein the transaction steps or transaction operations in step (a) are multi-threaded.

14. The method of claim 12 wherein the transaction is paused prior to the commit operation.

15. A method of performing dual writes for replicating transactions among plural databases located at different nodes, each transaction being one or more transaction steps or transaction operations, at least some of the transaction steps or transaction operations being update steps or operations, the method comprising:

(a) initiating a transaction at an originating node;

(b) inhibiting the dual write replication process from communicating transaction steps or operations of the transaction with one or more other nodes until an update step or operation occurs within the transaction at the originating node; and (c) upon the occurrence of the update step or operation and regardless of whether a commit operation has occurred, performing the dual write replication process with respect to the one or more other nodes and sending with the update step or operation all transaction steps or operations for the transaction that have occurred prior to the update step or operation for the transaction, or prior to the previous update step or operation if a previous update step or operation existed for the transaction.

16. The method of claim 15 further comprising:

(d) determining if the originating node needs to receive a data record from the one or more other nodes during the dual write replication process; and (e) sending the data record to the originating node only if it is determined that the originating node needs the data record.

17. A method of performing dual writes for replicating transactions among plural databases located at different nodes, each transaction being one or more transaction steps or transaction operations, at least some of the transaction steps or transaction operations being update steps or operations which are performed only after database locking occurs, the method comprising:

(a) initiating a transaction at an originating node; and (b) the dual write replication process causing database locking to occur at one or more other nodes only upon the occurrence of an update step or operation in the transaction at the originating node.

18. The method of claim 17 further comprising:

(d) determining if the originating node needs to receive a data record from the one or more other nodes during the dual write replication process; and (e) sending the data record to the originating node only if it is determined that the originating node needs the data record.

* * * * *